(12) United States Patent
Chen et al.

(10) Patent No.: US 7,066,282 B2
(45) Date of Patent: Jun. 27, 2006

(54) APPARATUS AND METHODS FOR MEASURING FORMATION CHARACTERISTICS IN PRESENCE OF CONDUCTIVE AND NON-CONDUCTIVE MUDS

(75) Inventors: Yong-Hua Chen, Newtown, CT (US); Tarek M. Habashy, Danbury, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 150 days.

(21) Appl. No.: 10/744,827

(22) Filed: Dec. 23, 2003

(65) Prior Publication Data
US 2005/0133262 A1    Jun. 23, 2005

(51) Int. Cl.
*E21B 47/01* (2006.01)
(52) U.S. Cl. ............ 175/50; 166/250.11; 166/254.2
(58) Field of Classification Search .............. None
See application file for complete search history.

(56) References Cited

U.S. PATENT DOCUMENTS

| | | | |
|---|---|---|---|
| 2,582,314 A | 1/1952 | Doll | 175/182 |
| 2,712,627 A | 7/1955 | Doll | 324/1 |
| 4,567,759 A | 2/1986 | Ekstrom et al. | 73/152 |
| 5,045,795 A | 9/1991 | Gianzero et al. | 324/342 |
| 5,235,285 A | 8/1993 | Clark et al. | 324/342 |
| 5,442,294 A * | 8/1995 | Rorden | 324/339 |
| 5,467,832 A * | 11/1995 | Orban et al. | 175/45 |
| 5,720,355 A * | 2/1998 | Lamine et al. | 175/27 |
| 6,191,588 B1 | 2/2001 | Chen | 324/367 |
| 6,348,796 B1 | 2/2002 | Evans et al. | 324/374 |
| 6,396,276 B1 * | 5/2002 | Van Steenwyk et al. | 324/366 |
| 2002/0166699 A1 | 11/2002 | Evans | 175/26 |

OTHER PUBLICATIONS

Doll, H. G. *Introduction to Induction Logging and Application to Logging of Wells Drilled with Oil Base Mud.* Journal of Petroleum Technology. vol. 1, No. 6 (1949) pp. 149-162.

Ekstrom, J.P., Dahan, C. A., Chen, M.Y., Lloyd, P.M., and Rossi, D.J. *Formation Imaging with Microelectrical Scanning Aarrays.* The Log Analyst, vol. 28, No. 3 (1987) pp. 294-306.

Clark, B. Luling, M.G., Jundt, J. Ross, M. and Best, D. *A Dual Depth Resistivity Measurement for FEWD.* SPWLA Twenty-Ninth Annual Logging Symposium, Jun. 5-8, 1988.

* cited by examiner

Primary Examiner—Zakiya W. Bates
(74) Attorney, Agent, or Firm—David P. Gordon; Jody Lynn DeStefanis; William L. Wang

(57) ABSTRACT

Tools for investigating an earth formation in the presence of either oil-base or water-base mud include a circuit which induces current into the formation in a focused manner, and a sensor electrode which is isolated from the circuit, at least partially surrounded by the circuit, and located in the area in which the current is focused. The current inducing circuit may be an oppositely polarized double-dipole circuit to which voltage is applied with the two dipoles sharing a common radiating element over which a focused area is formed. Insulators separate the outer electrodes of the double-dipole circuit from the common radiating element. Alternatively, the current inducing circuit is a coil arranged in a partial toroidal configuration in an insulated area that at least partially surrounds the focused area and which separates the focused area from return electrodes.

43 Claims, 19 Drawing Sheets

APPARATUS AND METHODS FOR MEASURING FORMATION CHARACTERISTICS IN PRESENCE OF CONDUCTIVE AND NON-CONDUCTIVE MUDS

BACKGROUND OF THE INVENTION

1. Field of the Invention

This invention relates broadly to hydrocarbon exploration and production. More particularly, this invention relates to apparatus and methods for measuring formation characteristics such as resistivity and permittivity.

2. State of the Art

In the hydrocarbon exploration and production industry, it is of practical importance to be able to detect the formation properties such as resistivity and permittivity surrounding a wellbore. Two classes of methods are generally employed for such purpose. A first class of methods, as represented by U.S. Pat. No. 2,582,314 to Doll which is hereby incorporated by reference herein in its entirety, utilizes magnetic dipoles to excite electromagnetic wavefields in the formation. A second class of methods, as represented by U.S. Pat. No. 2,712,627 to Doll, and U.S. Pat. No. 4,567,759 to Ekstrom, et al. which are both hereby incorporated by reference herein in their entireties, utilize electrodes to excite electromagnetic wavefields in the formations. In both cases, the electromagnetic wavefields permit the measurements of the formation resistivity.

It will be appreciated by those skilled in the art that the methods utilizing electrodes for measurement of formation resistivity rely on direct electric current conduction between the tool and the formation. As a result, they are only applicable in boreholes drilled with conductive muds; i.e., generally water b ase muds. However, it is desirable to have techniques which enable electrode-type methods to operate in both conductive and non-conductive (i.e., oil base) muds.

In a recent U.S. Patent Application Publication 2002/0166699 to Evans, a measurement-while-drilling (MWD) apparatus is disclosed which purports to measure formation resistivity in the presence of oil-base muds. The Evans device utilizes focusing and defocusing as taught in U.S. Pat. No. 6,348,796 to Evans et al., via the use of measurement electrodes, focusing electrodes, and a guard electrode on a pad, and a diffuse return electrode on the tool, and attempts to determine resistivity of the formation across the capacitive coupling of the non-conductive mud by measuring current at a frequency of 1 MHz. The idea proposed by Evans has many drawbacks. First, the electrode configuration of Evans is unlikely to work efficiently at the proposed frequency due to the skin effect. In other words, Evans cannot generate strong enough electromagnetic wavefields in the formation to permit a realistic measurement of the formation. Second, the focusing and defocusing scheme of Evans is undesirable in that it requires a larger measuring electrode that reduces image resolution. Over-focusing in order to overcome image resolution problems may lead to negative measured currents (and hence negative apparent resitivities) depending on the amount of standoff and the contrast between the mud resitivity and formation resistivity. It may also lead to a large squeeze effect resulting in determinations which exaggerate the thickness of conductive beds and which miss thin resistive layers. In addition, over-focusing may make the measurements more prone to borehole rugosity effects and irregular motion of the tool, particularly for larger standoff conditions.

As disclosed in U.S. Pat. No. 6,191,588 to Chen which is hereby incorporated by reference herein in its entirety, an alternate method of obtaining formation resistivity in the presence of non-conductive muds is to excite a large voltage drop within the wellbore. Since the formation is in parallel to the mud layer and is generally more conductive than the mud, the voltage variations within the borehole are more sensitive to the formation resistivity. As a result, one can obtain the formation resistivity by measuring the voltage distribution within the borehole. While this technique provides good results, it is limited to operation in oil base muds. In addition, it does not work optimally in very resistive formations, especially when the mud resistivity is not much higher than the formation resistivity.

SUMMARY OF THE INVENTION

It is therefore an object of the invention to provide apparatus which may be used to find formation resistivity in the presence of either oil base or water base muds.

It is another object of the invention to provide apparatus which may be used to find indications of formation permittivity in the presence of either oil base or water base muds.

It is a further object of the invention to provide a compact formation imaging tool which may be used to image a formation in the presence of either oil base or water base muds.

It is an additional object of the invention to provide methods for imaging a formation in the presence of oil base or water base muds.

In accord with these objects, which will be discussed in detail below, a tool for investigating an earth formation is provided and includes a circuit which induces current into the formation in a focused manner, and a sensor electrode having a formation-facing surface which is insulated from surface elements of the circuit, at least partially surrounded by the circuit, and located in the area in which the current is focused. In one embodiment, the current inducing circuit is an oppositely polarized double-dipole circuit to which voltage is applied. In this embodiment, the two dipoles preferably align axially with each other and share a common radiating element over which a focused area is formed. The sensor electrode is located within the focused area, and the sensor electrode is maintained at the same potential as the radiating element. Insulators are provided that separate the outer electrodes of the double-dipole circuit from the common radiating element. The insulators are preferably no more than 10 cm in width, and are preferably on the order of less than 1 cm in width, thereby providing a compact circuit.

In another embodiment, the current inducing circuit is a coil to which current is applied. The coil is arranged in a substantially toroidal configuration in an insulated area that at least partially surrounds the focused area and which separates the focused area from return electrodes. Again, the insulated area in which the coil is located and which separates the outer return electrodes from a common inner electrode is preferably no more than 10 cm in width.

According to another aspect of the invention, where measured current(s) at the sensor electrode(s) is (are) used directly to measure resistivity, for an oil base mud environment, the circuit frequency is preferably in the 10 Mhz to 100 Mhz range. For a water base mud environment, the generated current is preferably around 5 Khz, although the circuit can be operated in the same frequency range (10 Mhz to 100 Mhz) as used for the oil base mud environment.

According to another aspect of the invention, the earth formation investigating tool may include a single sensing electrode or a plurality of sensing electrodes in the focused area. When more than one electrode is utilized, the face (surface) of each electrode is electrically insulated from the other electrodes and from surface elements of the current inducing circuit. Typically, the plurality of electrodes are arranged as one or more arrays of electrodes. In measurement-while-drilling (MWD) applications, due to the rotation of the tool, a single sensing electrode is all that is required to obtain full azimuthal coverage.

According to another embodiment of the invention, the tool for investigating an earth formation includes a circuit which induces current into the formation in a focused manner and comprised of two or more sets of source electrodes, and a sensor electrode having a formation-facing surface which is insulated from surface elements of the circuit, at least partially surrounded by the circuit, and located in the area in which the current is focused. Where the current inducing circuit utilizes double-dipole circuits, two sets of double-dipole circuits are utilized, with all four dipoles preferably sharing a common radiating element over which a focused area is formed. Insulators are provided that separate the outer electrodes of an outer double-dipole circuit from the outer electrodes of an inner double-dipole circuit, and the outer electrodes of the inner double-dipole circuit from the common radiating element. Where the current inducing circuit utilizes a coil to which current is applied, two sets of coils are arranged in substantially toroidal configurations in two sets of insulated areas that surround the focused area. A first set of insulated areas separate the focused area from a first set of inner return electrodes, while a second set of insulated areas separate the inner return electrodes from the outer return electrodes. In either two-source electrode arrangement, the operating frequency for oil-base muds can be reduced to on the order of 500 Khz by firing the source electrodes either alternatively at a single frequency, or simultaneously at two slightly different frequencies, and making two current measurements. The difference between the two current measurements can be used to obtain an apparent formation resistivity.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
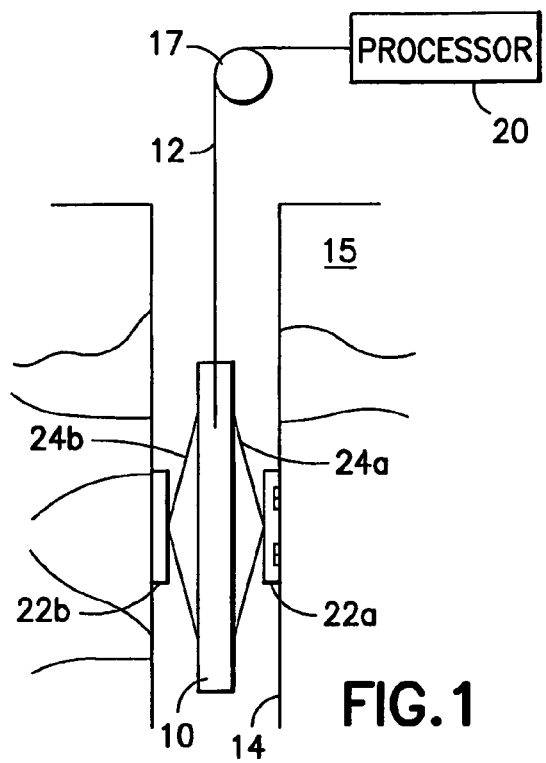
FIG. 1 is a block diagram of a system incorporating the invention.

Turning now to FIG. 1, a block diagram of a system incorporating the invention is seen. The system includes a tool 10 which is suspended via a cable 12 in a borehole 14 which traverses a formation 15. The cable 12 is wound about a winch 17 or suitable suspension means located at the surface of the earth formation, and may be utilized, if desired, to carry information which is sent by the tool 10 to a processor 20. The tool 10 is shown with pads 22a, 22b which are pressed against mudcake (not shown) on the borehole wall 14a using spring arms 24a, 24b. In accord with the invention, information is gathered by the tool 10 by use of one or more electrodes located on the pads 22a, 22b. As is well known in the art, the gathered information may be preprocessed downhole by processing means (not shown) associated with the tool 10 and may be sent via the cable 12, or via wireless mechanisms (e.g., mud pulsing) for additional uphole processing. The uphole processing may be located in the vicinity of the formation 15 or at another site as desired. Alternatively, raw data may be sent uphole.

Figure 2:
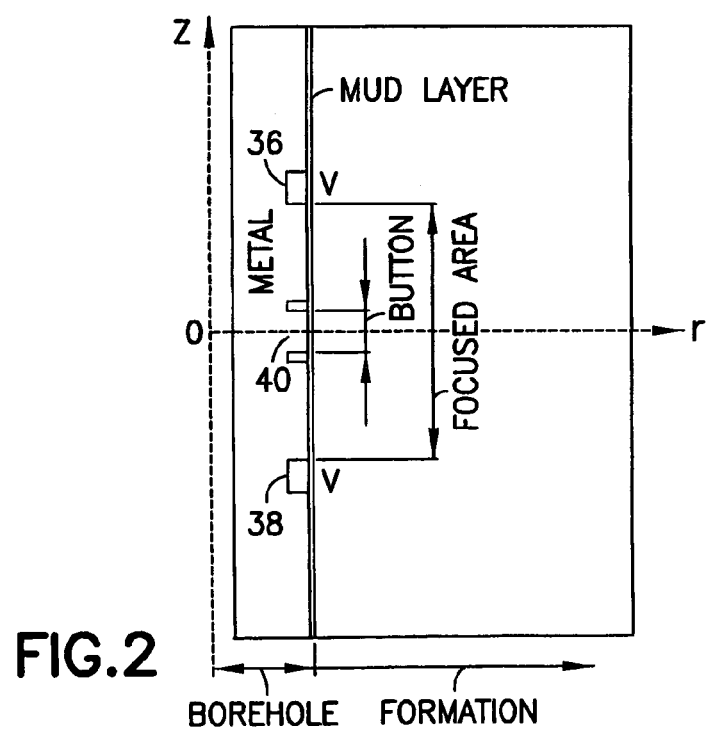
FIG. 2 is a diagram of a two-dimensional model useful in understanding the theoretical concepts of the invention.

As has been previously established, the mudcake on the borehole wall may be relatively conductive in the case where water-base mud is used in the borehole, or may be relatively resistive in the case where oil-base mud is used in the borehole. Since it is desirable that the tool 10 be able to be used in both situations, a new tool and technique for investigation of the borehole is required. The basis for such a tool and technique is shown in the diagram of FIG. 2. In particular, in FIG. 2 a diagram of a two-dimensional model of the invention shows the formation 15, the borehole 14, and a mud(cake) layer 33 therebetween, and certain elements of the tool 10 which are located in the borehole and pressed up against the mudcake 33. The tool elements include two dipole antennas 36 and 38 (also called "source electrodes") which are oppositely polarized, and a measuring button 40 (also called "sensor electrode").

Figure 3:
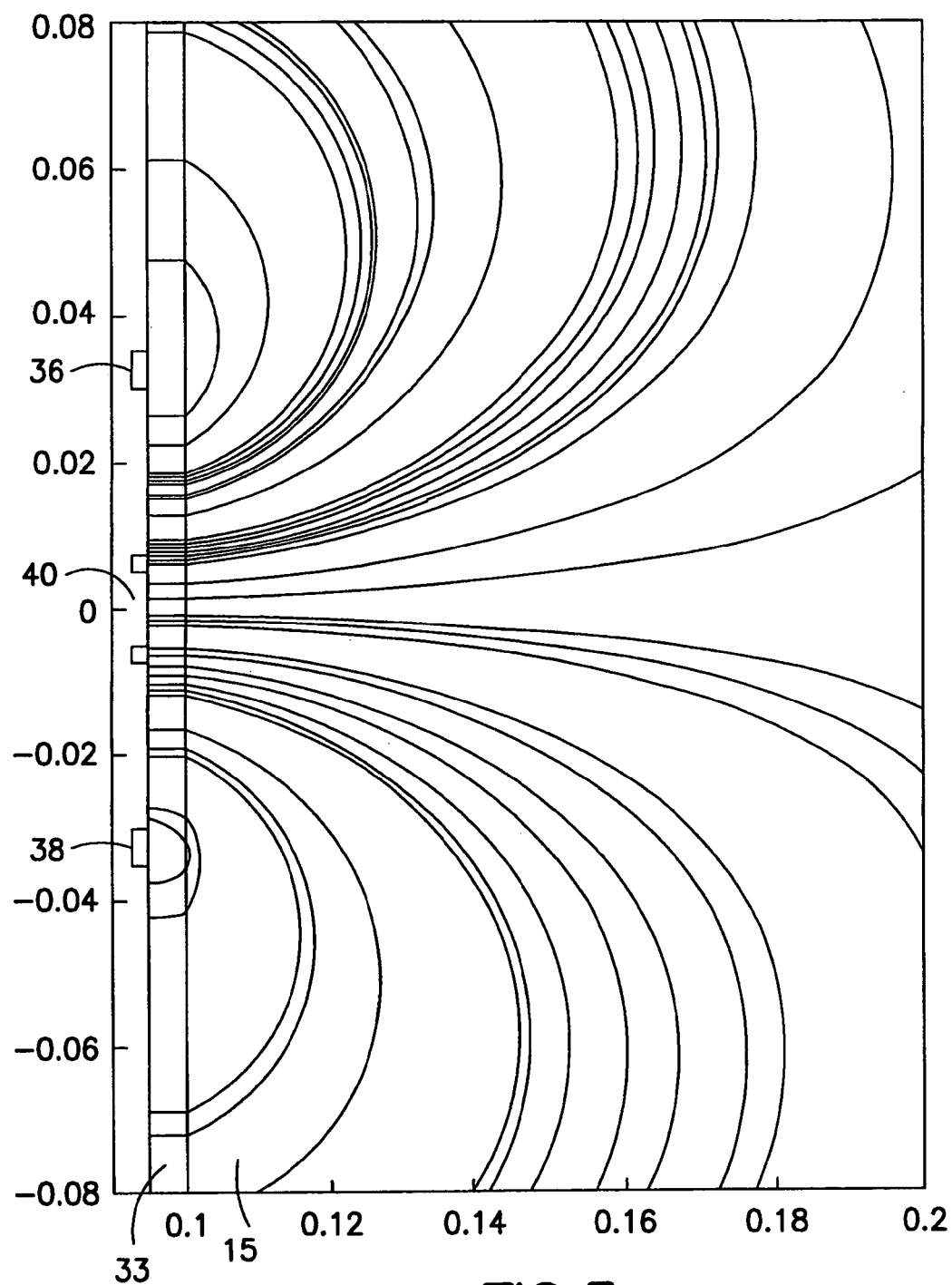
FIG. 3 is a diagram showing simulated current flow lines resulting from the model of FIG. 2.
Figure 4A:
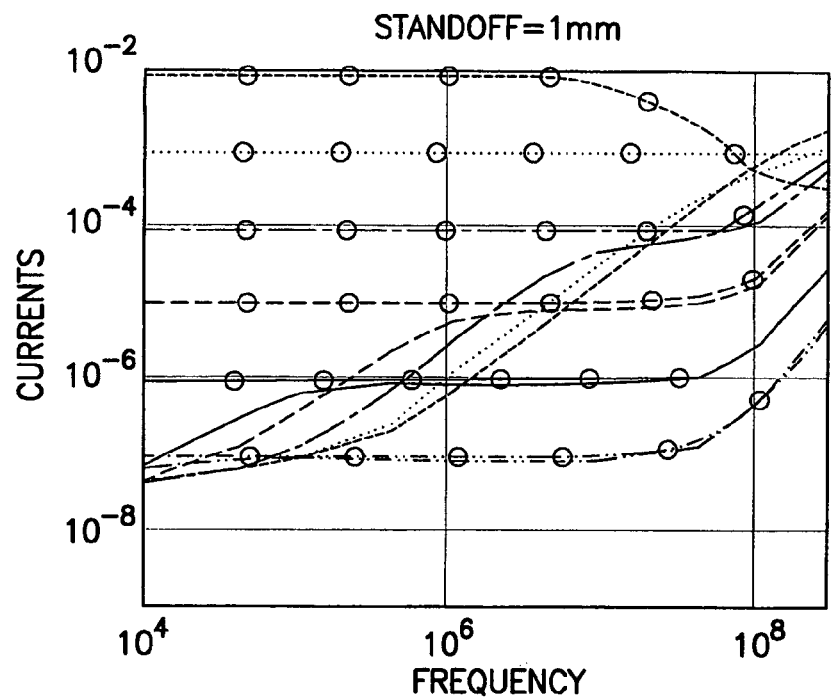
FIGS. 4a–4d are four cross-plots showing simulated in-phase current responses for formations of different resistivities with different mud standoffs.
Figure 4B:
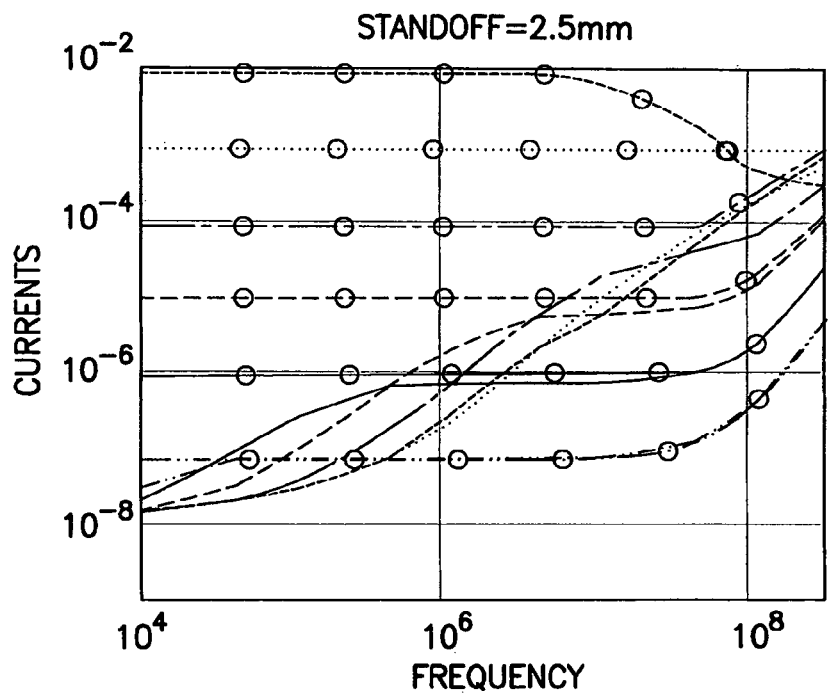
Figure 4C:
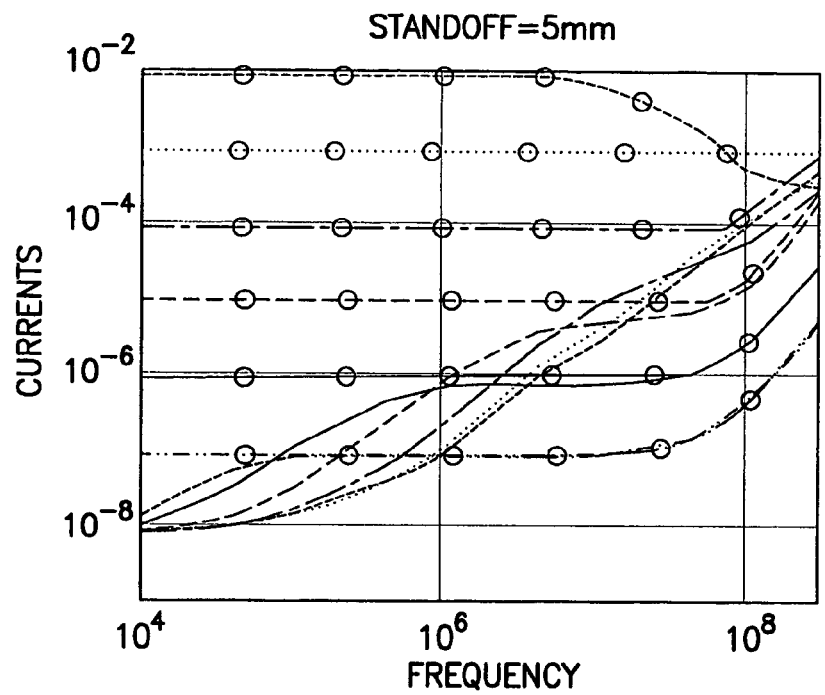
Figure 4D:
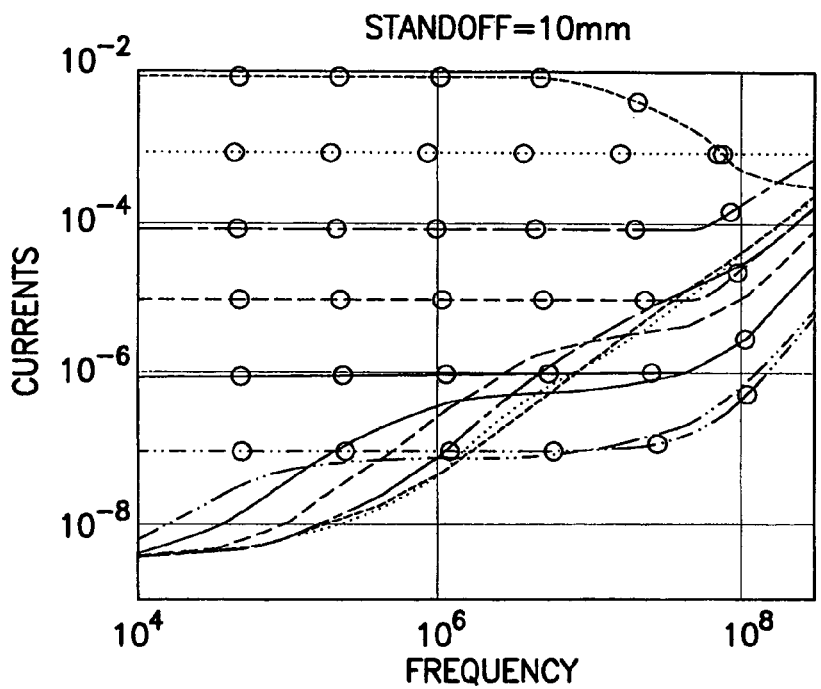

Simulated current flow lines resulting from the model of FIG. 2 are seen in FIG. 3. Current is seen to go around the feeding points of the two dipole antennas 36, 38 and to focus nicely at the center of the source electrodes where the sensing electrode 40 is located. Due to the focusing, the current which is being measured goes radially through the mud layer 33 into the formation 15. As a result, the current is an indication of the impedance of the formation and that of the mud layer.

In order for the tool of the invention to properly measure the formation properties, the effects of the mud layer must be overcome. For conductive mud, current can penetrate the mud layer easily regardless of the operating frequency. As a result, the mud layer has only a small effect on the measurement. For resistive mud, however, the mud layer acts as an insulating layer in front of the tool and only very limited current can reach the formation. In order to overcome the impedance of the resistive mud, in accord with the invention, the tool must be operated at higher frequencies. As the frequency increases, the mud layer acts as a capacitance for the measuring current and the capacitive impedance of the mud layer is effectively reduced. At the same time, the attenuation due to the conductive formation and the dielectric effect become more significant. As a result, it is desirable to select the tool operating frequency carefully based at least partially on the mud properties which are also functions of frequency.

Turning now to FIGS. 4a–4d, four cross-plots showing simulated in-phase current responses for formation of different resistivities are provided based on permittivity and conductivity measurements of oil base muds. In FIGS. 4a–4d, current-frequency responses are shown where the solid lines represent the current responses for formations of six different resistivities ($R_t$=0.1, 1, 10, 100, 1,000, and 10,000 $\Omega$m) with the indicated standoff of the particular figure (i.e., FIG. 4a has a 1 mm standoff, FIG. 4b has a 2.5 mm standoff, etc.), and the dotted lines with "+" signs show the current responses for those formation resistivities where there is no mud layer. Since desirable operating frequencies are those where the resolution among different formation resistivities is good even in the presence of mud, based on FIGS. 4a–4d it would appear that the frequency range of 10 Mhz-100 Mhz presents a favorable operating frequency range if the measured current is used directly to represent the formation resistivities.

In FIGS. 4a–4d, the current curves with no mud standoff are for reference only. However, it is interesting to see that when there is no mud layer the current is proportional to the formation resistivity over a rather wide range of frequencies until the formation dielectric effect starts to show up around 100 MHz. The huge difference in current response when there is a mud layer is mostly due to the high resistivity of the mud. At the low frequency end, the mud layer acts as an insulator and prevents the current from entering the formation. As a result, the current is not sensitive to the formation. As the frequency increases, the mud layer acts as a capacitance and its impedance reduces with the frequency. Thus, the current starts to reflect the formation resistivity. It will be appreciated that if the mud is conductive, the current response for non-zero mud standoff will not be significantly different from that for zero mud standoff.

The simulated results of FIGS. 4a–4d suggest that the currents, if used directly, are not exactly linearly proportional to the formation resistivity even in the frequency range of 10 Mhz–100 Mhz. This is due to high attenuation in conductive formations as well as dielectric effects in resistive formations. The results show that the propagation phenomenon starts to manifest itself around 80–100 MHz. As a result, a frequency in the range of 80–100 Mhz is a good frequency to use if measurement of both the formation resistivity and the formation permittivity is desired. If only measurement of the formation resistivity is desired, a slightly lower frequency is appropriate because the dielectric effects are less. On the other hand, if only measurement of the formation dielectric constant is desired, a slightly higher frequency is better.

Figure 5A:
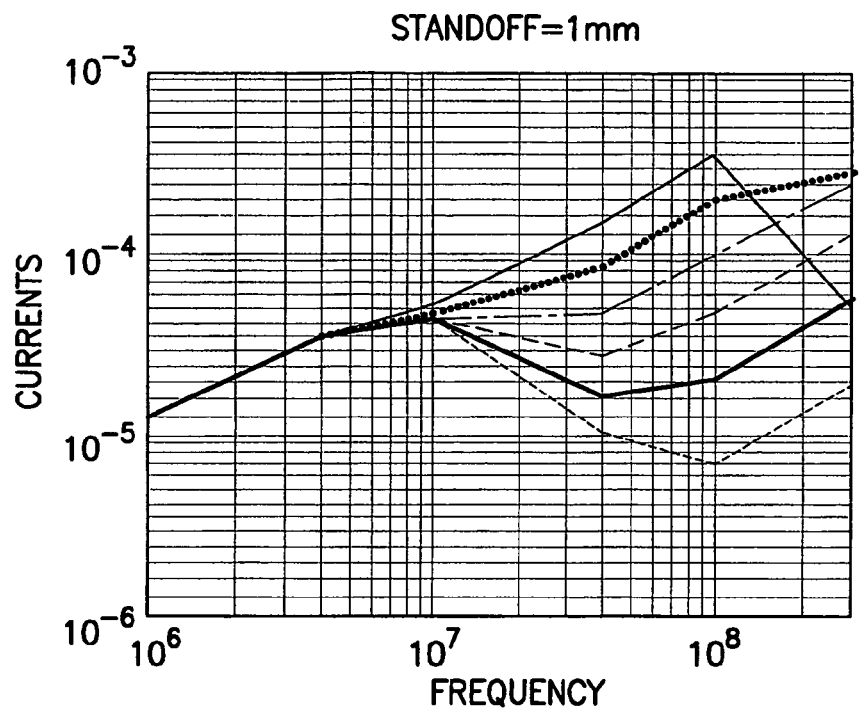
FIGS. 5a–5d are four cross-plots showing simulated out-phase current responses for formation of different permittivity with different mud standoffs.
Figure 5B:
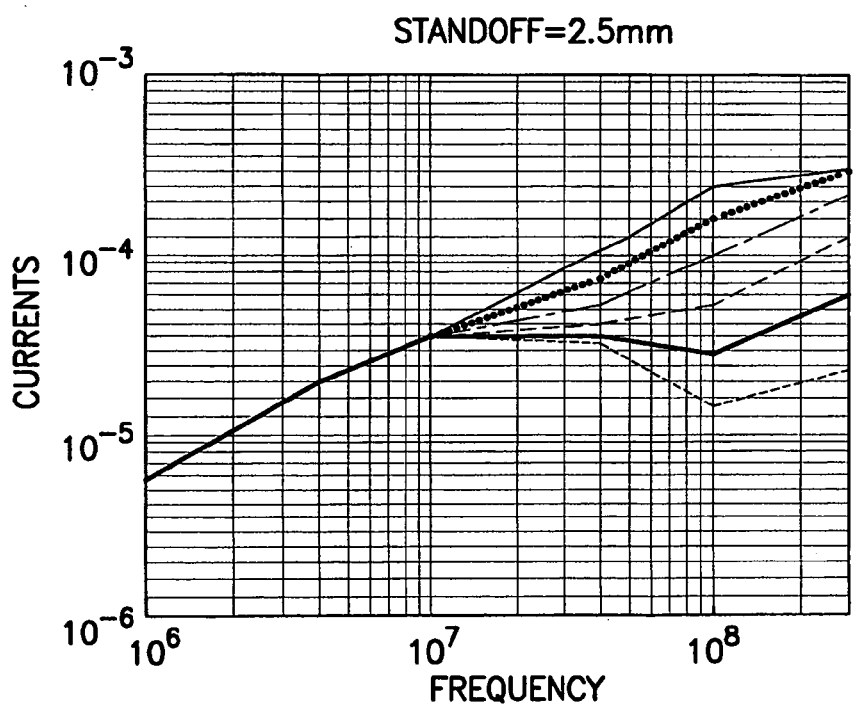
Figure 5C:
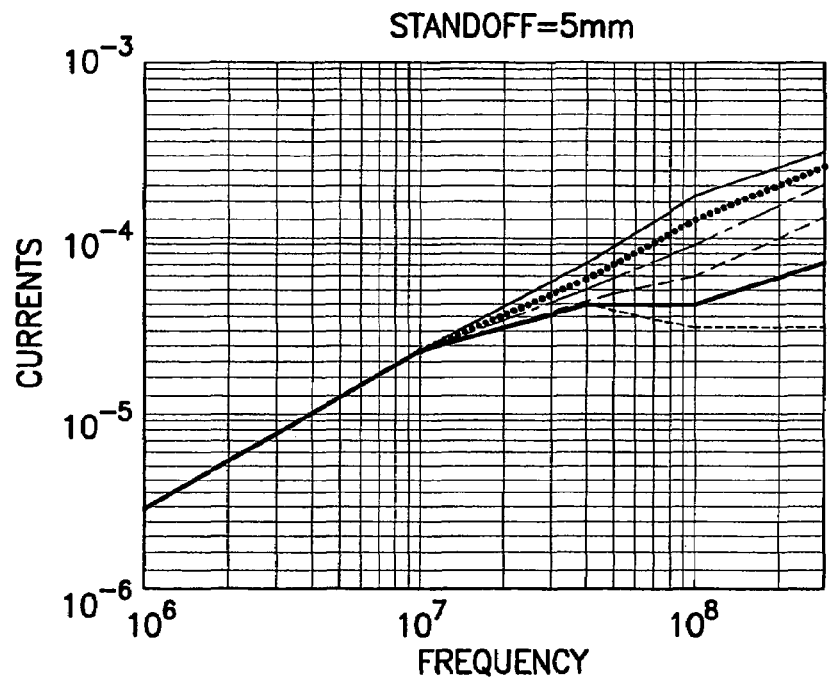
Figure 5D:
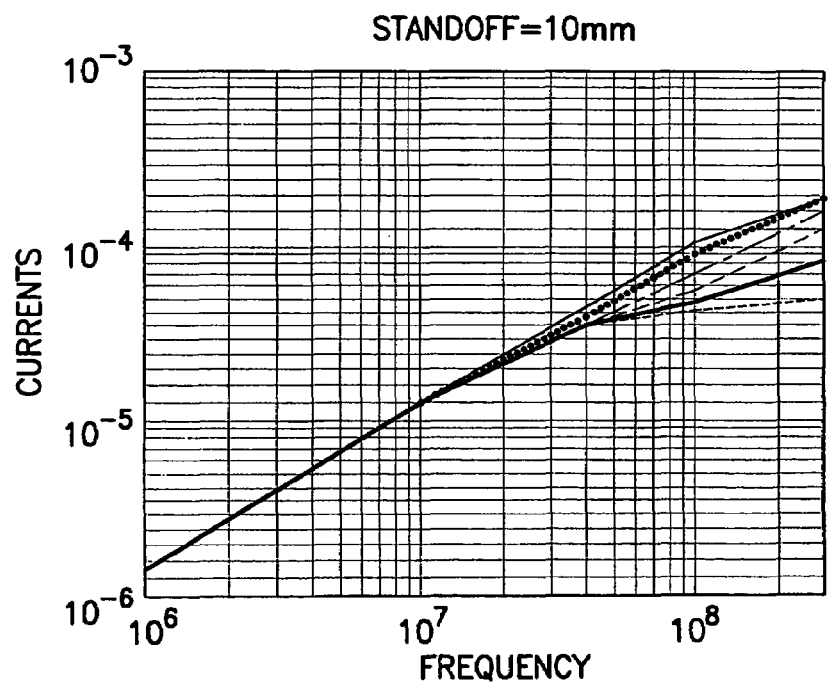

FIGS. 5a–5d are cross-plots showing the current variation versus frequency for formations with different permittivity ($\epsilon_r$=3, 6, 12, 24, 48, 96) but at a fixed formation resistivity ($R_t$=10 $\Omega$m) for standoffs ranging from 1 mm (FIG. 5a) to 10 mm (FIG. 5d). Because the measured current varies with formation permittivity, these simulated results show that the model of FIG. 2 can also be used to measure the formation permittivity, or at a minimum, to show variations (e.g., relative values) of the permittivity in order to provide an image thereof. With the provided arrangement, a radially-polarized electric field is generated and permittivity is measured therefrom. This is in contrast to existing permittivity measuring techniques which induce and measure an electric field in parallel to the borehole.

Figure 6A:
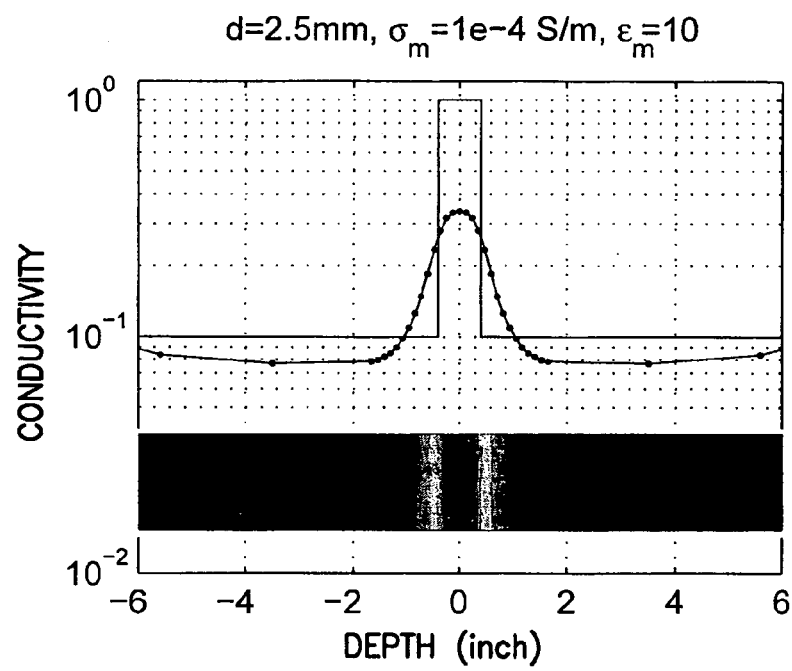
FIGS. 6a and 6b are simulated logs and their corresponding resistivity images at an operating frequency of 100 Mhz for two different three layer mediums including an oil-base mud layer.
Figure 6B:
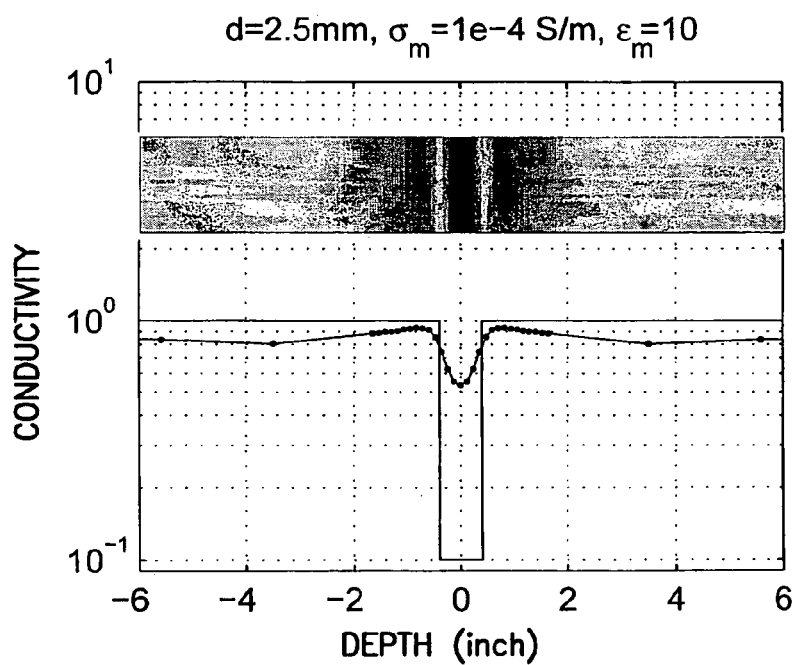

Turning now to FIGS. 6a and 6b, simulated logs and their corresponding resistivity images are shown for two different three layer mediums each having a center layer thickness of approximately 2 cm. The conductivities of the layers of the three layer mediums are shown by the straight line having the middle layer step (in the case of FIG. 6a the middle layer having an increased conductivity relative to the other layers, and in the case of FIG. 6b, the middle layer having a decreased conductivity relative to the other layers). In both cases a relatively resistive oil-base mud ($R_m$=10,000 $\Omega$m, $\epsilon_m$=10) is assumed with a standoff of 2.5 mm. An operating frequency of 100 Mhz is utilized. As is seen in both FIGS. 6a and 6b, the resulting logs (the curved lines) reasonably track the formation resistivity (conductivity), although the model does a better job where the middle layer is less resistive (FIG. 6a) as opposed to being more resisitive (FIG. 6b).

Figure 7A:
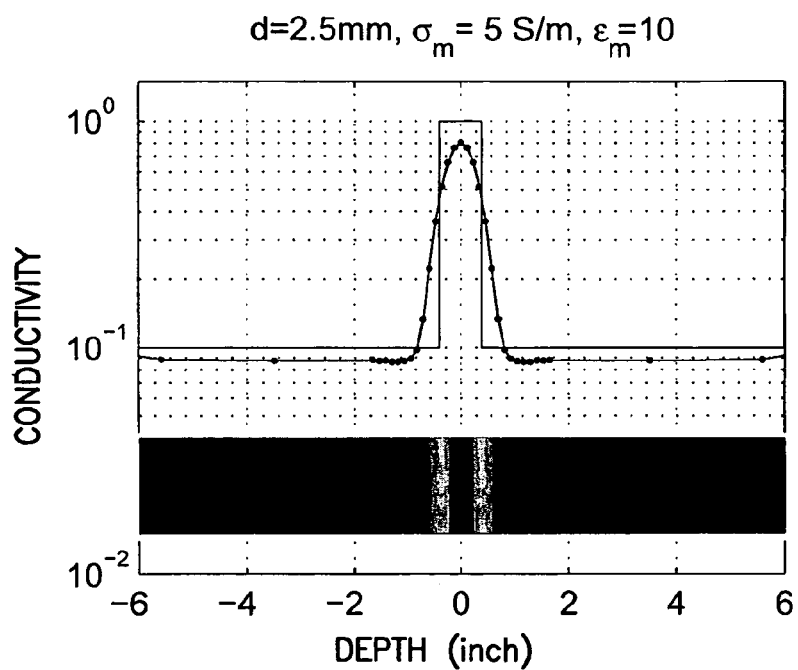
FIGS. 7a and 7b are simulated logs and their corresponding resistivity images at an operating frequency of 5 Khz for two different three layer mediums including a center water-base mud layer.
Figure 7B:
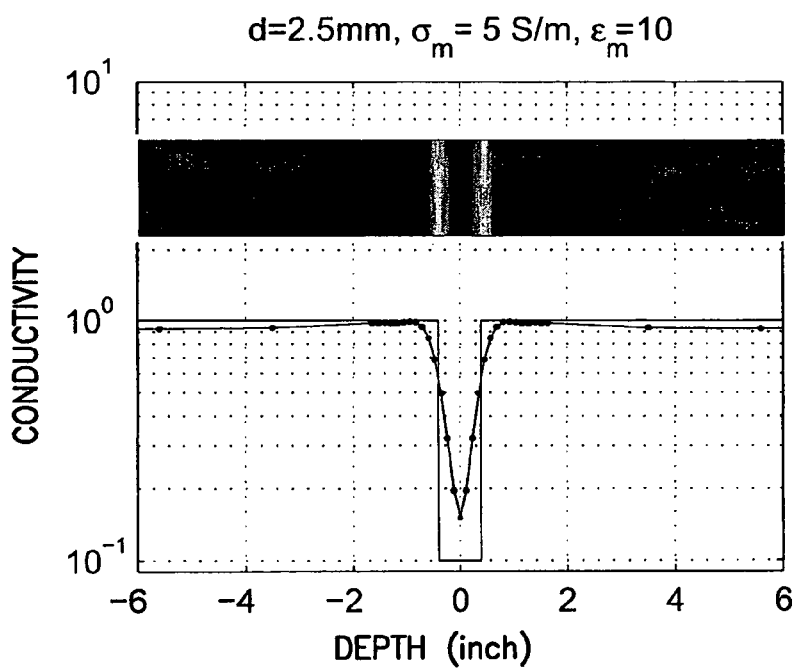
Figure 8A:
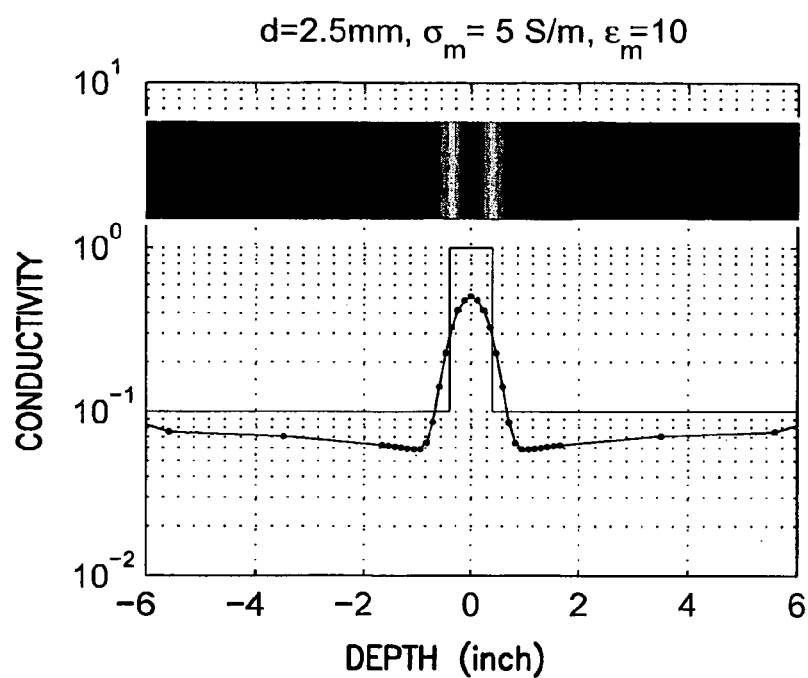
FIGS. 8a and 8b are simulated logs and their corresponding resistivity images at an operating frequency of 100 Mhz for two different three layer mediums including a water-base mud layer.
Figure 8B:
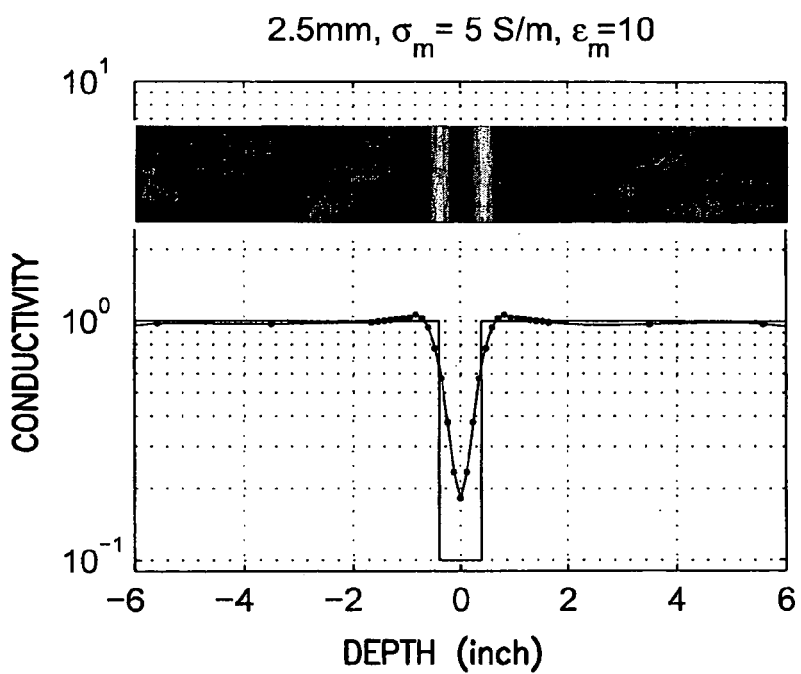

FIGS. 7a and 7b are simulated logs and their corresponding resistivity images for the same three layer mediums of FIGS. 6a and 6b, but where the model assumes a water-base mud layer ($R_m$=0.2 $\Omega$m, $\epsilon_m$=10) and an operating frequency of 5 Khz (which is typically used for water base mud imaging). Similarly, FIGS. 8a and 8b are simulated logs and their corresponding resistivity images for the same three layer mediums, but assuming the same water-base mud layer as in FIGS. 7a and 7b but using an operating frequency of 100 Mhz. By comparing FIGS. 6a, 7a, and 8a, and FIGS. 6b, 7b, and 8b, it will be appreciated that the model of FIG. 2 is useful for both conductive and non-conductive muds, and that similar results will be obtained in the case of conductive muds regardless of whether a relatively low operating frequency (5 Khz) is utilized or whether the relatively high operating frequency (100 Mhz) also useful for non-conductive muds is utilized.

Figure 9A:
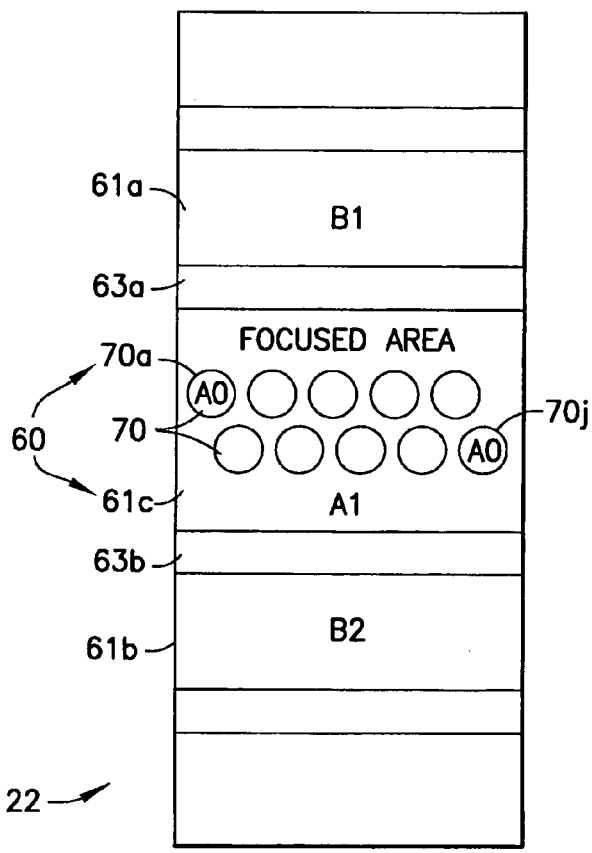
FIGS. 9a and 9b are front and cross-sectional views of a first embodiment of a pad of the tool shown in FIG. 1 which implements the model of FIG. 2.
Figure 9B:
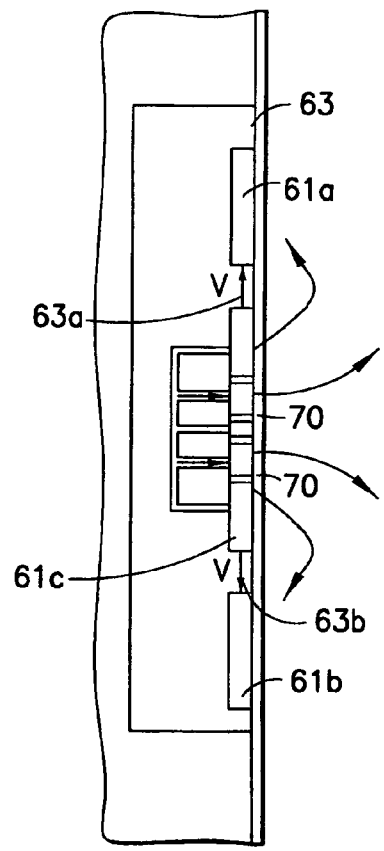

In accordance with the invention, the model of FIG. 2 may be implemented in various manners. A first such implementation for the model is shown in FIGS. 9a and 9b which are front and cross-sectional views of a pad 22 of the tool 10 shown in FIG. 1 which implements the model of FIG. 2. More particularly, pad 22 includes an oppositely polarized double-dipole circuit 60 to which voltage is applied and an array of sensor buttons 70. The oppositely polarized double-dipole circuit 60 includes three preferably metallic source electrode areas 61a, 61b, 61c which are separated from each other by a preferably dielectric insulator 63 (including insulator areas 63a and 63b). Source electrode areas 61a and 61c which are separated by insulator area 63a effectively constitute a first dipole circuit (i.e., the equivalent of source electrode 36 of FIG. 2). Similarly, the source electrode areas 61b and 61c which are separated by insulator area 63b effectively constitute a second dipole circuit (i.e., the equivalent of source electrode 38 of FIG. 2). In this embodiment, the two dipoles share the common radiating element 61c over which a focused current area is formed. Also, in this embodiment, the insulators 63a, 63b are-preferably no more than 10 cm in width, and are preferably on the order of less than 1 cm in width. The array of sensing buttons 70 is seen in FIG. 9a to include ten buttons 70a–70j arranged in two offset rows of five buttons each. Two rows of offset buttons are used to increase the measurement density. The formation-facing surface of each sensing button 70 is insulated from the surface of the common radiating element 61c.

As previously mentioned, the dipole sources are polarized in opposite directions and this causes current to be focused at the common radiating element 61c adjacent the buttons 70. Thus, the current exchange between the pad and the formation at places where each of the buttons is located can be measured. It is noted that the potential of the sensing buttons 70 is preferably kept to the same potential as electrode 61c to avoid flow of current between the electrode 61c and buttons 70. This may be done by directly connecting the electrode 61c to the sensing buttons behind the pad surface. In such an arrangement, a current-measuring circuit would be located behind each button before the connection of the button to the electrode such that the current sensed by each button could be measured. Alternatively, a circuit could be utilized to monitor the voltage difference between each button and the electrode 61c, and a feedback loop could be utilized to automatically maintain a zero voltage difference.

By operating at optimized frequencies, currents measured by the buttons 70 are sensitive to the properties of the formation in front of them. Through inversion, and as described in more detail hereinafter, the formation resistivity and permittivity may be accurately determined from these currents.

According to the preferred embodiment of the invention, the capacitance over the insulator 63 between the radiating elements 61a, 61b, 61c and the metallic body of the tool 10 is made much smaller than that over the mud in front of the dipole antennas in order for the antennas to be efficient. If a metallic body must be used closely behind the dipole antennas, slots may be cut transverse to the antennas in order to reduce the capacitance at the back of the antennas and thereby increase the antenna efficiency.

Figure 10A:
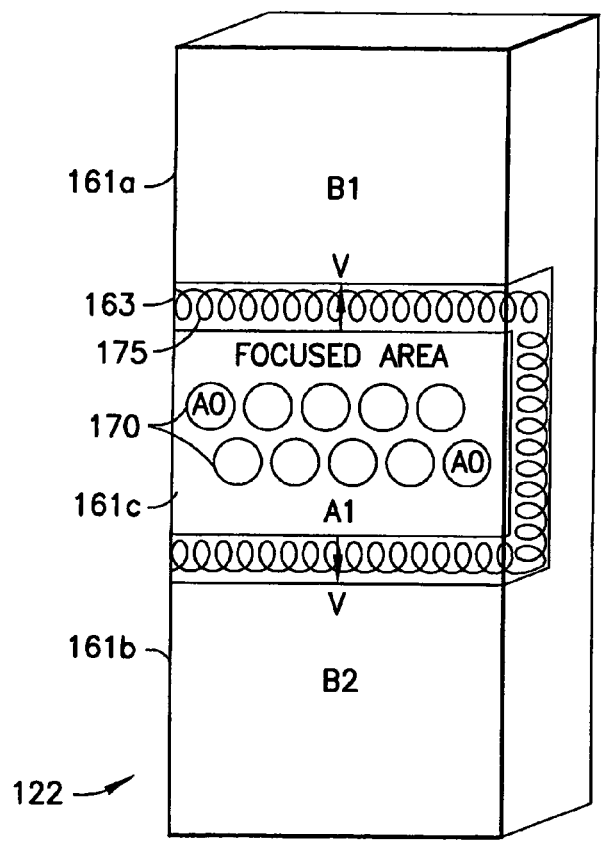
FIGS. 10a and 10b are front and cross-sectional schematic views of a second embodiment of a pad of the tool shown in FIG. 1 which implements the model of FIG. 2.
Figure 10B:
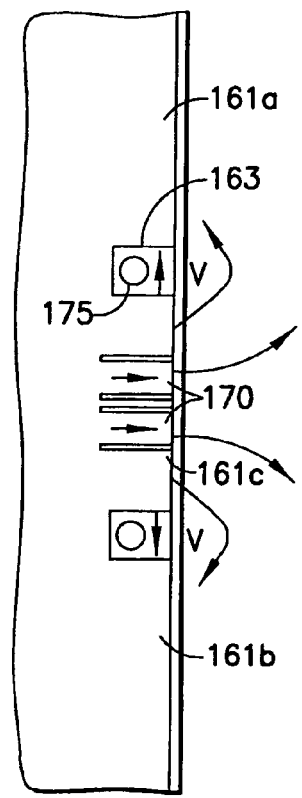

A second implementation of the model of FIG. 2 is seen in FIGS. 10a and 10b where pad 122 includes metal electrodes 161a, 161b, and 161c, sensing buttons 170, and an insulator 163 which houses a coil 175. The insulator 163 separates the metal electrodes 161a and 161b from the central electrode 161c and runs along the pad 122 such that the coil 175 extends around the electrode 161c and assumes a substantially toroidal shape. The buttons 170 are located within the central common electrode 161c; i.e., they are located in the focused area. As with the arrangement of FIGS. 9a, and 9b, the surfaces of the buttons 170 are electrically insulated from the surface of the central common electrode 161c.

With the arrangement of FIGS. 10a and 10b, application of a current to the coil 175 results in the generation of magnetic fields which in turn generate a voltage difference across electrodes 161a and 161c and across electrodes 161b and 161c. As a result, current flows from the central electrode 161c, through the mudcake, into the formation, and back (via the mudcake) to electrodes 161a and 161b. As with the arrangement of FIG. 10a, the current is focused in front of the buttons and may be measured by the buttons 170 which are maintained at the same potential as the central common electrode 161c.

While the embodiments of FIGS. 9a and 10a utilize multiple sensing buttons and are primarily directed to a pad-type tool, it will be appreciated by those skilled in the art that the invention is also applicable to "while-drilling" tools (e.g., LWD or MWD tools). In these tools, measurements are typically made as the tool is rotated in the borehole.

Figure 11A:
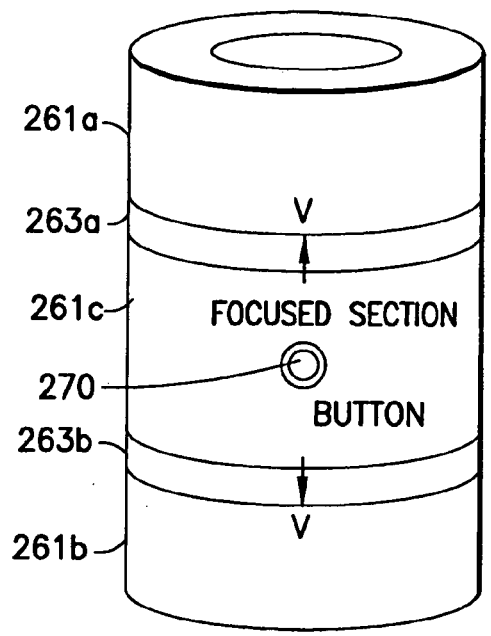
FIGS. 11a and 11b are schematic views of two additional embodiments of an apparatus particularly useful for while-drilling applications.
Figure 11B:
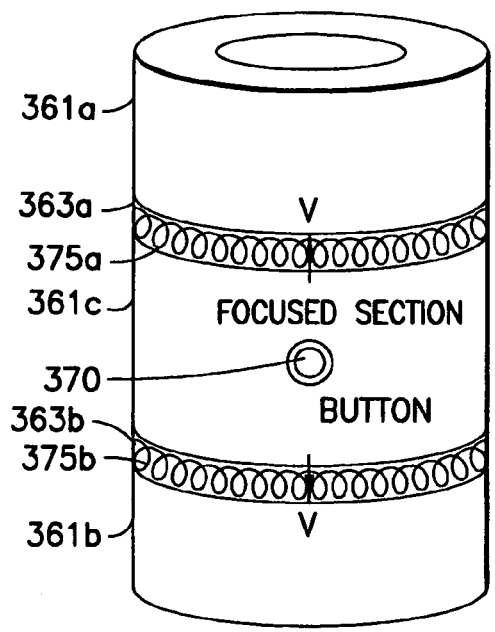

FIGS. 11a and 11b are schematic views of two additional embodiments of an apparatus particularly useful for while-drilling applications. FIG. 11a generally corresponds to the embodiment of FIGS. 9a and 9b, while FIG. 11b generally corresponds to the embodiment of FIGS. 10a and 10b. More particularly, the embodiment of FIG. 11a is provided with oppositely polarized double-dipole circuit 260 to which voltage is applied and a single sensor button 270. The oppositely polarized double-dipole circuit 260 includes three preferably metallic source electrode areas 261a, 261b, 261c which are separated from each other by a preferably dielectric insulators 263a and 263b. Source electrode areas 261a and 261c which are separated by insulator area 263a effectively constitute a first dipole circuit (i.e., the equivalent of source electrode 36 of FIG. 2). Similarly, the source electrode areas 261b and 261c which are separated by insulator area 263b effectively constitute a second dipole circuit (i.e., the equivalent of source electrode 38 of FIG. 2). In this embodiment, the two dipoles share the common radiating element 261c over which a focused current area is formed. Also, in this embodiment, the insulators 263a, 263b are preferably no more than 10 cm in width, and are preferably on the order of less than 1 cm in width. The single sensing button 270 is provided in the focused area of element 261 and insulated therefrom. Because the while-drilling tool rotates while the borehole is drilled, the single sensing electrode 270 is all that is required to obtain full azimuthal coverage. Of course, additional sensing buttons can be utilized if desired.

The embodiment of FIG. 11b presents a while-drilling implementation which utilizes a coil arrangement similar to FIGS. 10a and 10b. More particularly, the tool of FIG. 11b, includes metal electrodes 361a, 361b, and 361c, sensing button 370, and an insulator 363a, 363b which house toroidal coils 375a, 375b. Insulator 363a separates the metal electrode 361a from the central electrode 361c while insulator 363b separates the metal electrode 361b from the central electrode 361c. The sensor button 370 is located within the central common electrode 361c and is insulated therefrom; i.e., it is located in the focused area. Because the while-drilling tool rotates while the borehole is drilled, the single sensing electrode 370 is all that is required to obtain full azimuthal coverage. Of course, additional sensing buttons can be utilized if desired.

Since the measuring current (i.e., the current measured as passing through the sensor button(s)) in all of the embodiments of the invention passes radially through the mud and the formation in an electrically serial fashion, the mud resistivity always has an effect on the measurements. As shown above, by utilizing desirable frequencies, sensitivity to the formation resistivity can be obtained. To further reduce the mud effect, the apparent formation resistivity $R_a$ may be calculated directly from the measured current I according to:

$$R_a = K \, Re\{I^{-1}\}$$

where K is a scaling factor, and Re is a mathematic symbol indicating the real part of the expression in the parenthesis.

According to another aspect of the invention, the sensitivity to the formation resistivity can also be obtained by modifying the tool to provide multiple sets of source electrodes in order to effect two sets of oppositely polarized double-dipole circuits. More particularly, and referring now to FIG. 12a, a while-drilling tool is shown having five preferably metallic source electrode elements 461a, 461b, 461c, 461d and 461e which are separated by four preferably dielectric insulators 463a, 463b, 463c, and 463d. Insulators 463a–463d are preferably no more than 10 cm in width, and are preferably on the order of less than 1 cm in width. A single sensing button 470 is provided within element 461c and has a front face which is insulated from the front face thereof. Because the while-drilling tool rotates while the borehole is drilled, the single sensing electrode 470 is all that is required to obtain full azimuthal coverage. Of course, additional sensing buttons can be utilized if desired. Likewise, the use of multiple oppositely polarized double-dipole circuits (as described in more detail below) can be used on a pad-type device shown in FIGS. 9a and 9b.

The provision of five separate electrodes effectively implements two sets of oppositely polarized double-dipole circuits 460a, 460b to which voltage is applied. A first oppositely polarized double-dipole circuit 460a includes three preferably metallic source electrode areas 461a+461d, 461b+461e, and 461c with area 461a+461d separated from central source area 461c by dielectric insulator 463a, and area 461b+461e separated from area 461c by dielectric insulator 463b. Source electrode areas 461a+461d and 461c which are separated by insulator area 463a effectively constitute a first dipole circuit (i.e., the equivalent of source electrode 36 of FIG. 2). Similarly, the source electrode areas 461b+461e and 461c which are separated by insulator area 463b effectively constitute a second dipole circuit (i.e., the equivalent of source electrode 38 of FIG. 2). The two dipoles share the common radiating element 461c over which a focused current area is formed. Also, in this embodiment, a second oppositely polarized double-dipole circuit 460b includes effectively three preferably metallic source electrode areas 461d, 461e, and 461c+461a+461b with source electrode area 461d being separated from source electrode area 461c+461a+461b by dielectric insulator 463c, and source electrode area 461e being separated from source electrode area 461c+461a+461b by insulator 463d. Source electrode areas 461d and 461c+461a+461b effectively constitute a first dipole circuit of the second set, while the source electrode areas 461e and 461c+461a+461b effectively constitute a second dipole circuit of the second set. The two dipoles of the second set share the common radiating area 461c+461a+461b over which a focused current area is formed. By being provided within element 461c, sensing button 470 is located in the focused area of both double-dipole source sets.

Figure 12A:
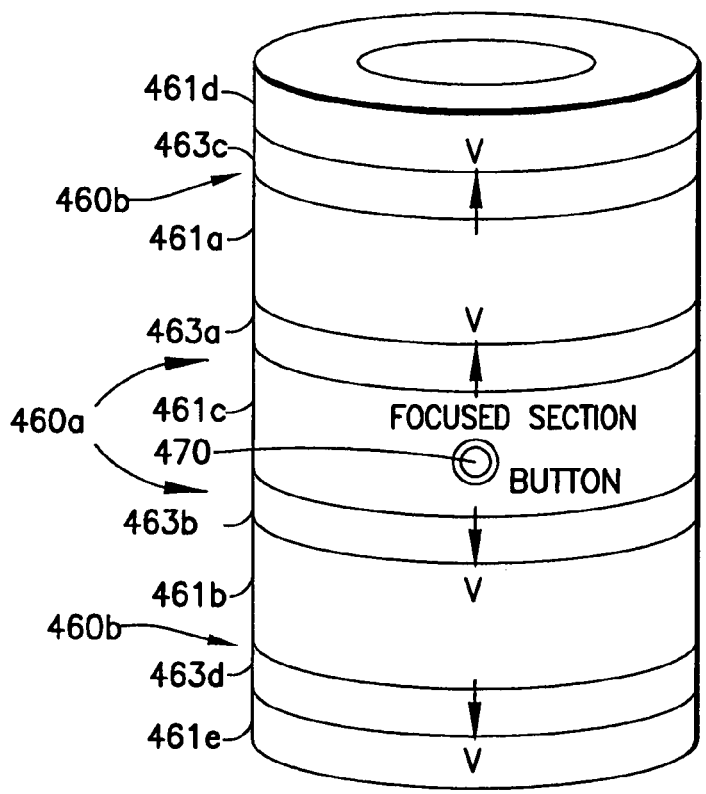
FIGS. 12a and 12b are schematic views of additional embodiments of the apparatus of the invention.
Figure 12B:
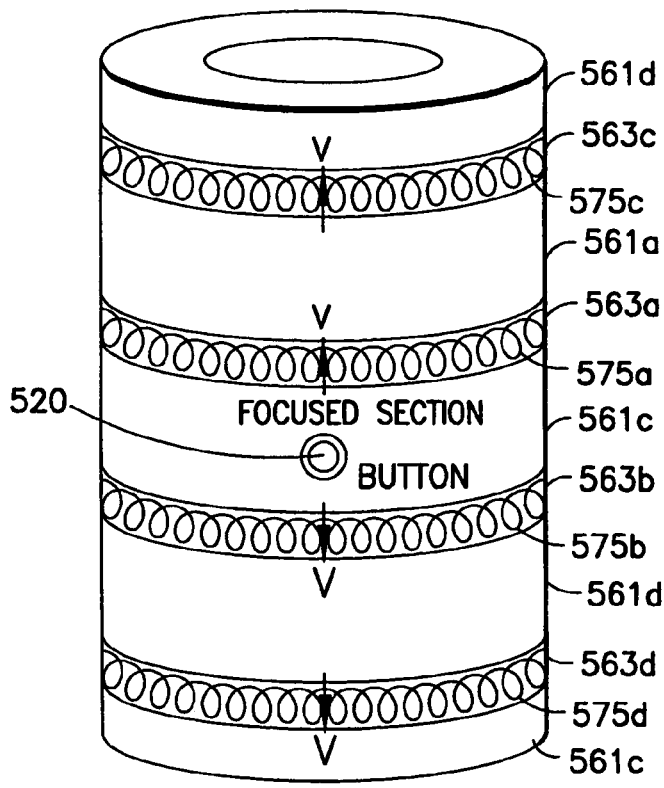
Figure 13A:
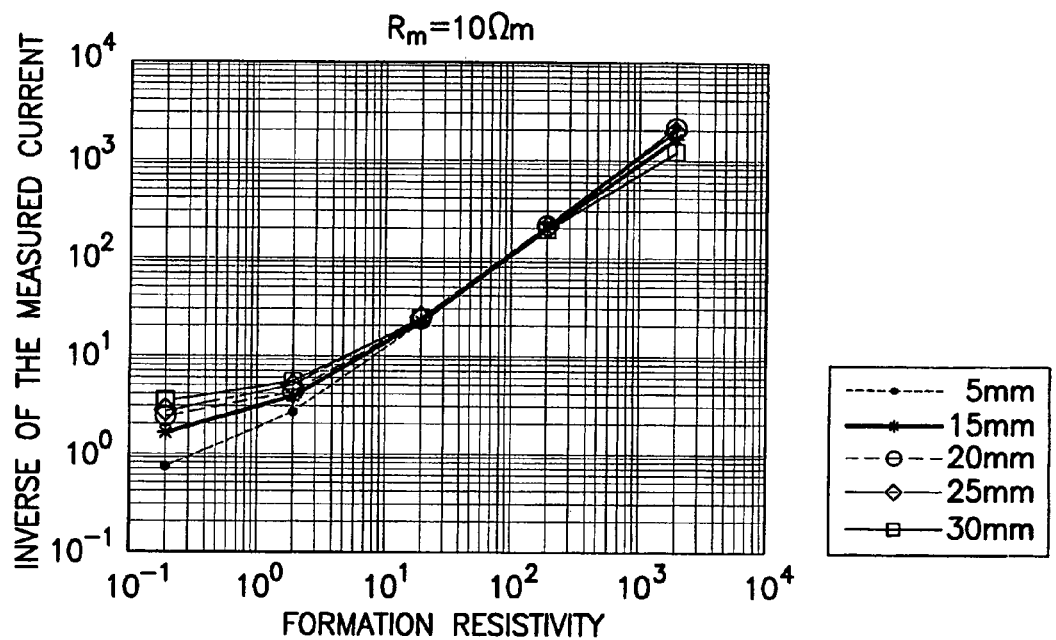
FIGS. 13a–13d are plots showing the effect of different mud resistivities and mud standoffs on the measured current for different formation resistivities.
Figure 13B:
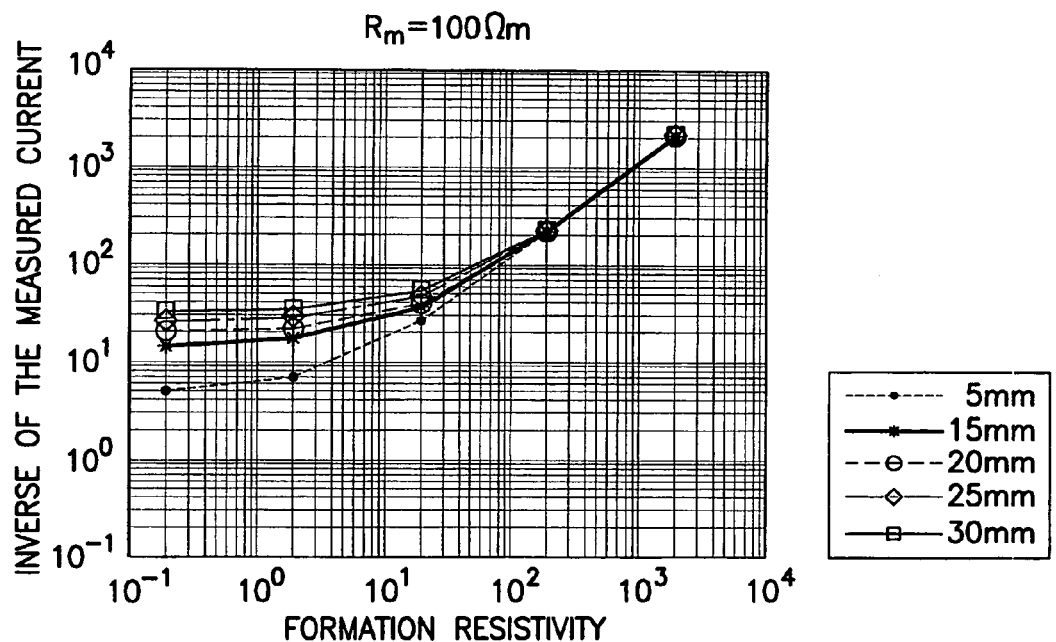
Figure 13C:
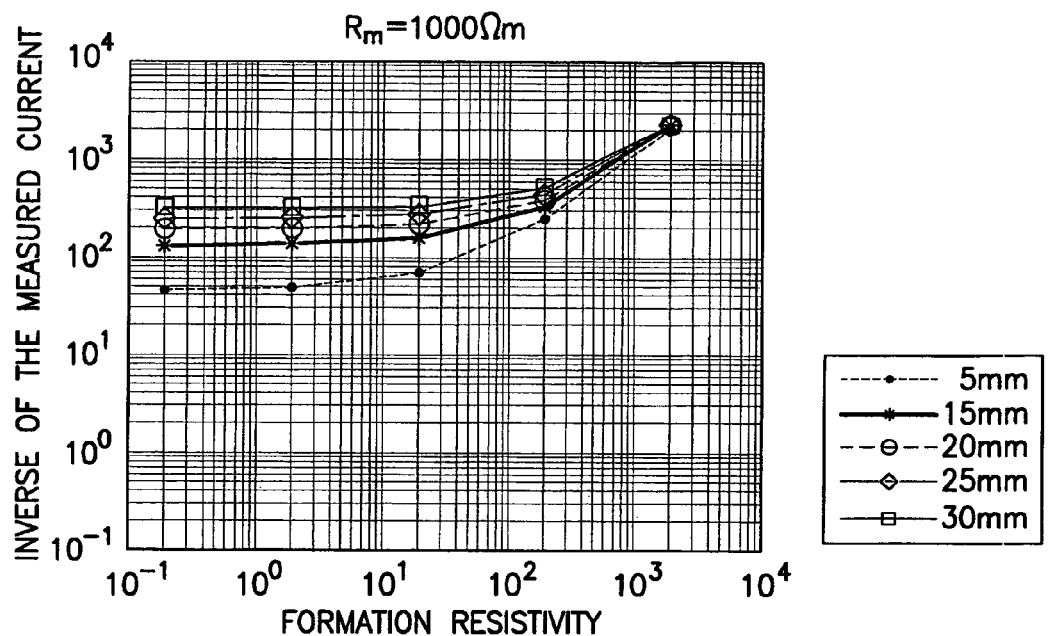
Figure 13D:
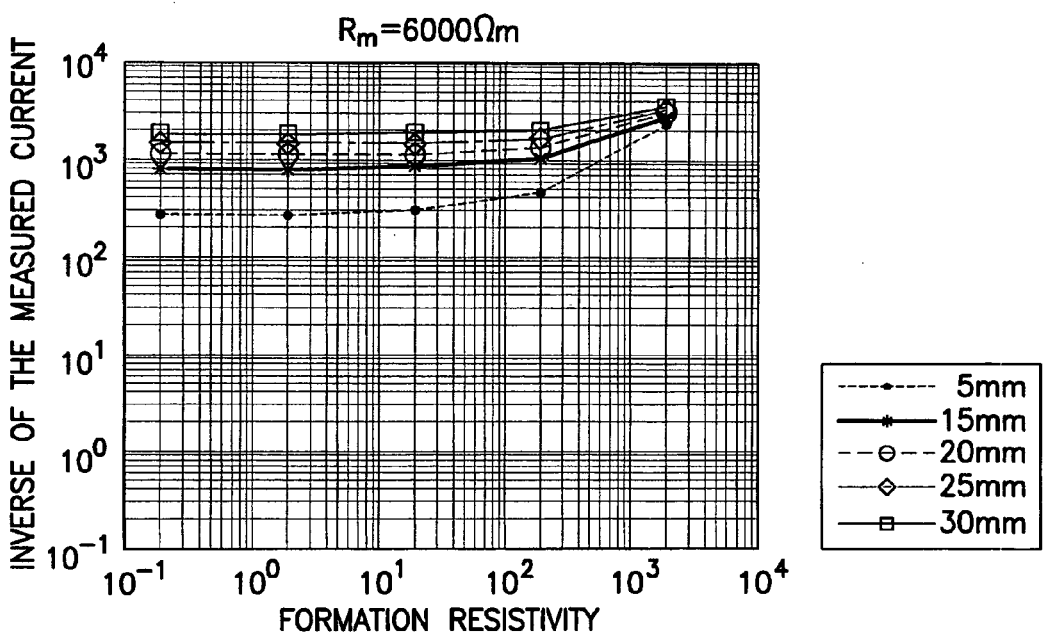
Figure 14A:
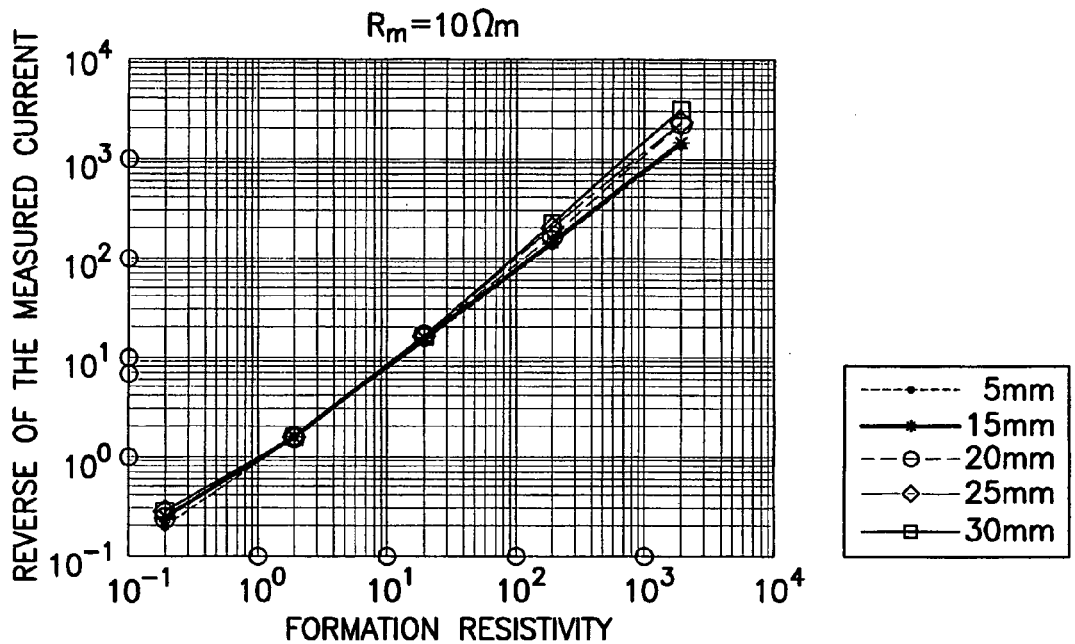
FIGS. 14a–14d are plots showing the effect of mud resistivities and mud standoffs on the measured current for different formation resistivities after mud correction with two source sets.
Figure 14B:
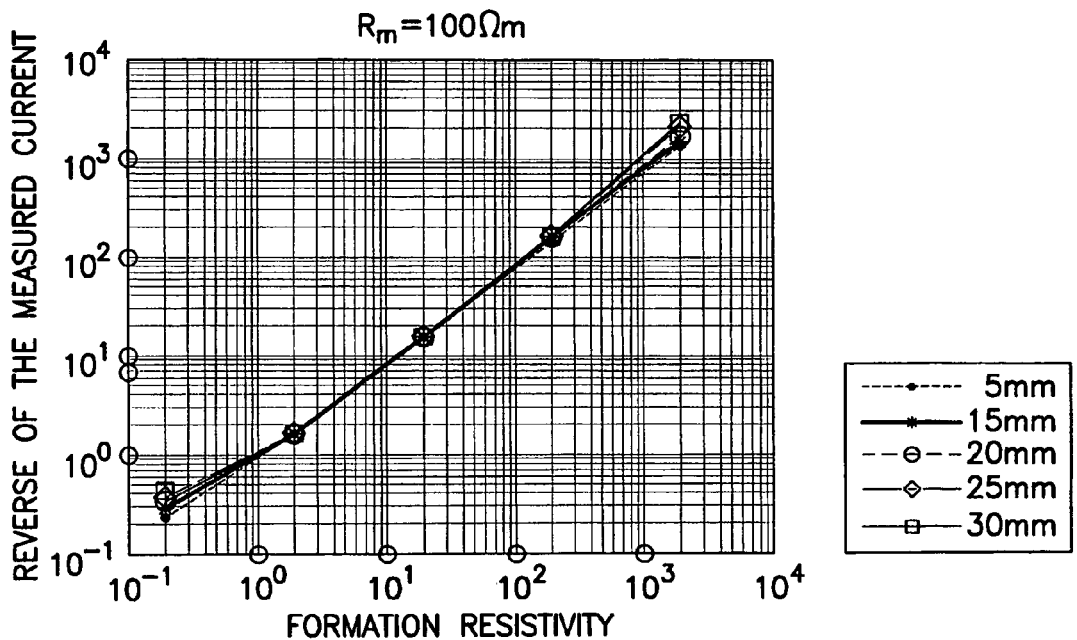
Figure 14C:
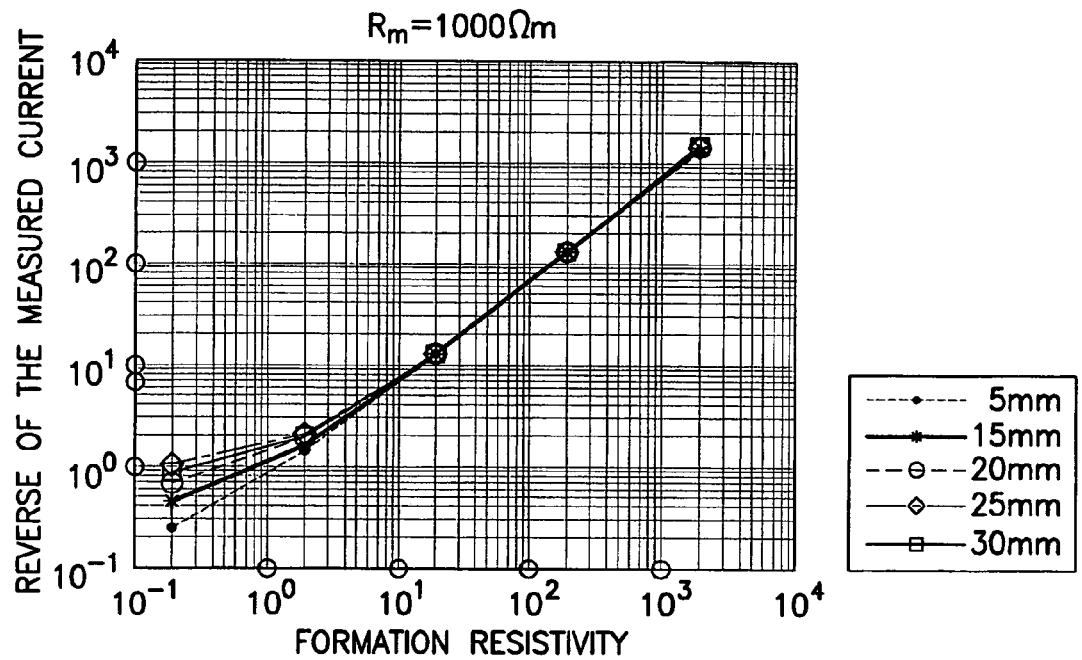
Figure 14D:
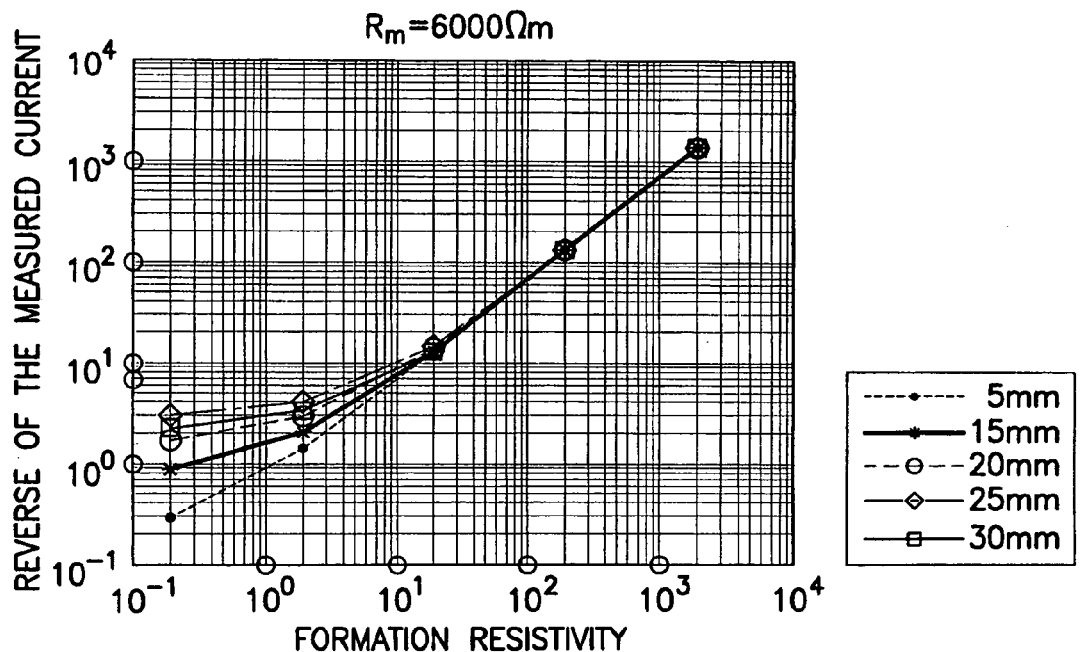
Figure 15A:
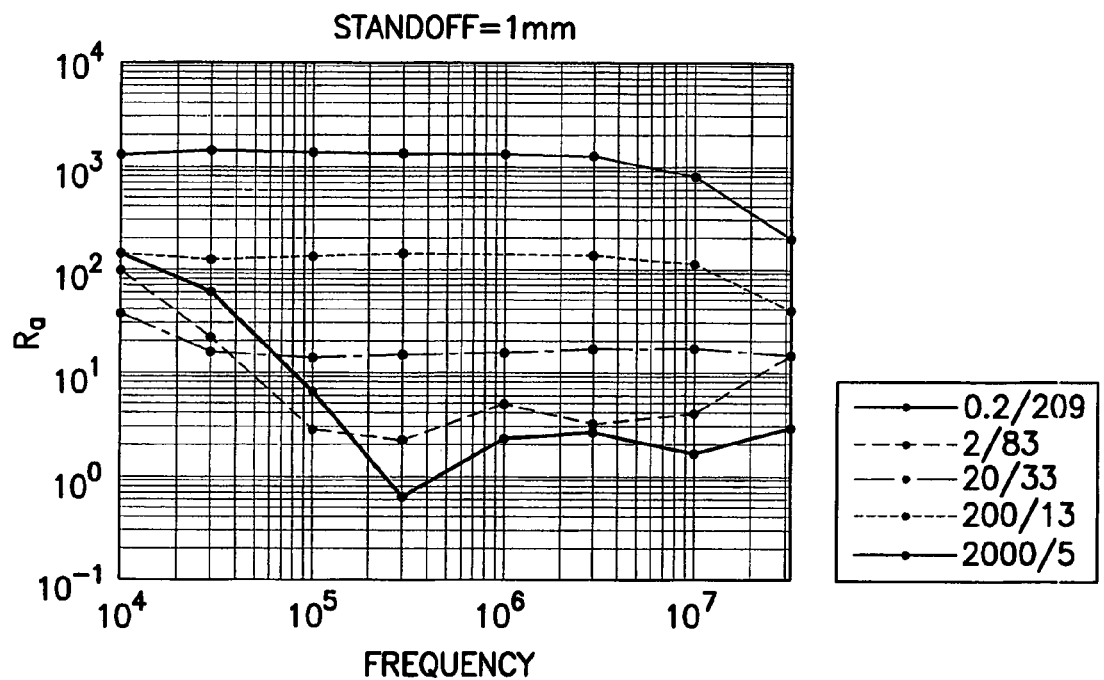
FIGS. 15a–15d are plots of apparent formation resistivities versus different operating frequencies sampled at different formation resistivities and at different mud standoffs for oil base muds.
Figure 15B:
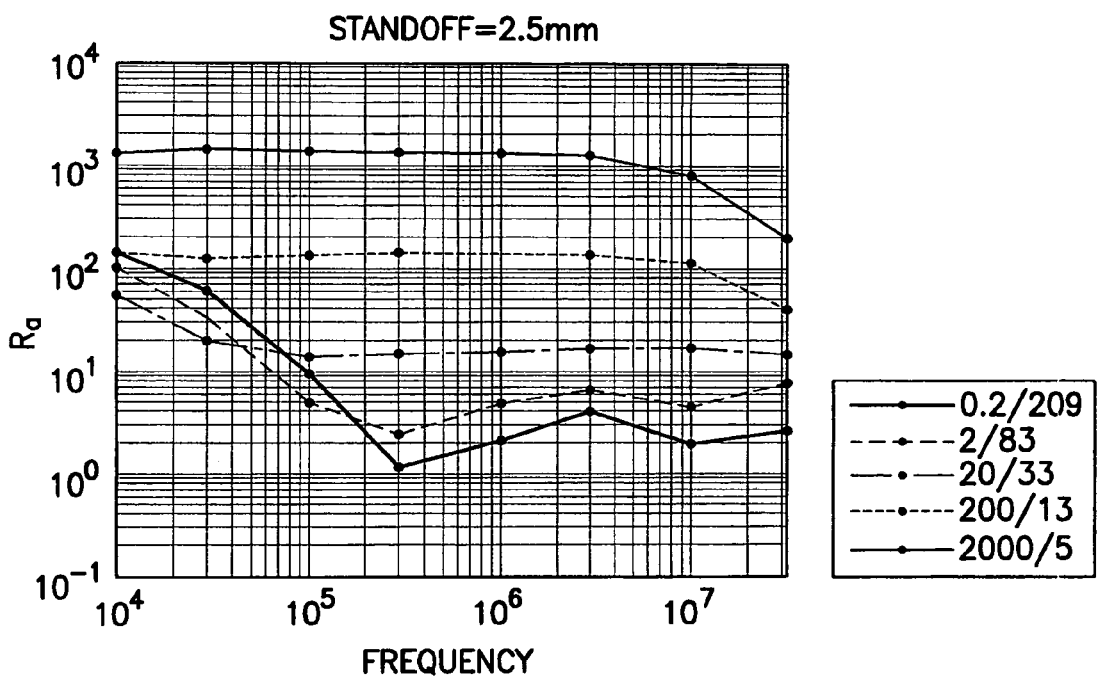
Figure 15C:
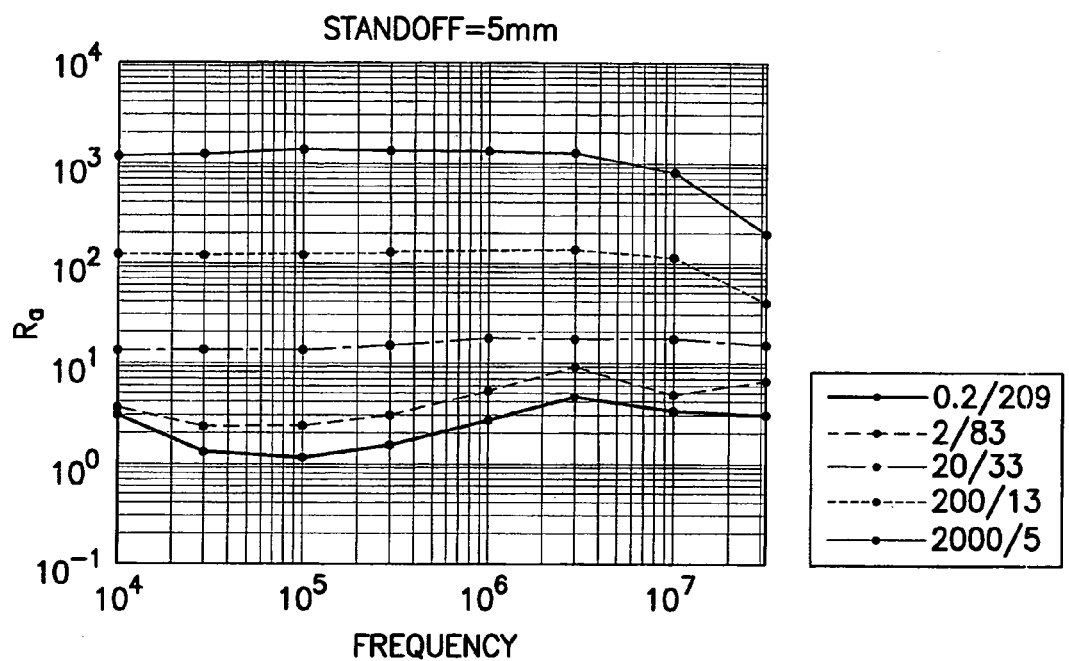
Figure 15D:
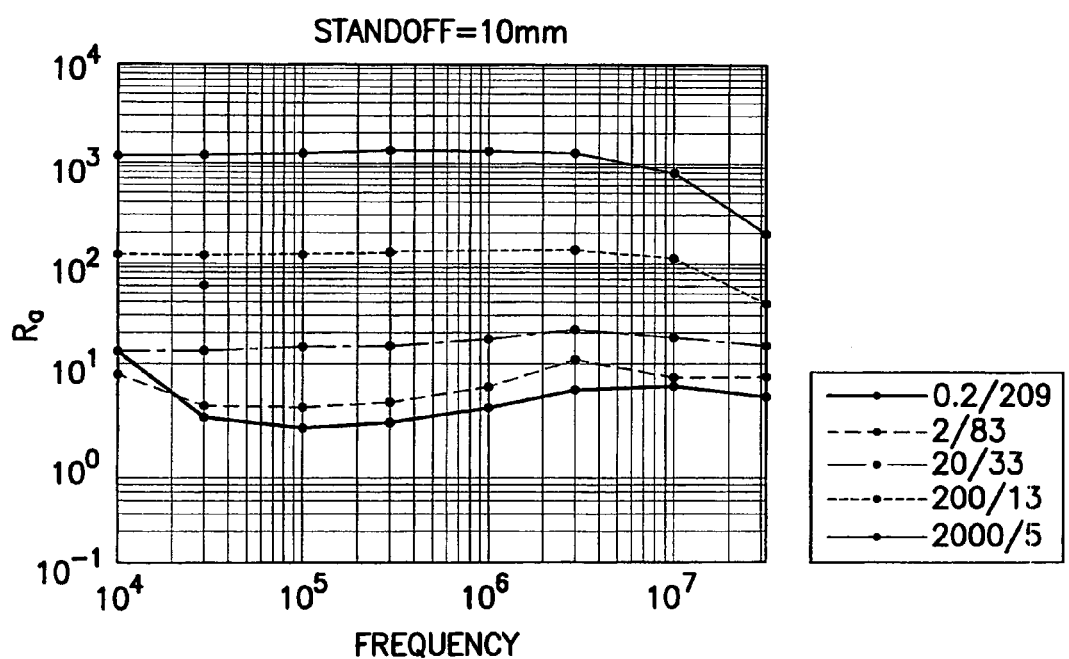

FIG. 12b provides an embodiment of the invention which extends the arrangement of the embodiment of FIG. 11b much in the same way that the embodiment of FIG. 12a extends the arrangement of the embodiment of FIG. 11a. Thus, the tool of FIG. 12b includes metal electrodes 561a–561e, sensing button 570, and insulators 563a–563d which house toroidal coils 575a–575d. Insulator 563a separates the electrode area 561a+561d (of a first group of electrodes) from the central electrode 561c while insulator 563b separates the metal electrode area 561b+561e (of the first group) from the central electrode 561c. Insulator 563c separates metal electrode 561d of a second group of electrodes from metal electrode area 561a+561b+561c, while insulator 563d separates metal electrode 561e (of the second group) from electrode area 561a+561b+561c. The sensor button 570 is located within the central common electrode 561c of both double-dipole source sets and has a front face which is insulated from the front face thereof. Because the while-drilling tool rotates while the borehole is drilled, the single sensing electrode 570 is all that is required to obtain full azimuthal coverage. Of course, additional sensing buttons can be utilized if desired. Likewise, the use multiple groups of electrodes can be used on a pad-type device shown in FIGS. 10a and 10b.

With two pairs of dipole-type transmitters as shown in FIGS. 12a and 12b, and with a single central receiver, the source sets may be fired alternatively at the same or different frequencies, or simultaneously at two, preferably slightly different frequencies. Two current measurements ($I_1$ and $I_2$) are made at the receiver button. With the same receiver button, the mud effect will be about the same for each of the two measurements. However, the formation influence will be less for the set of transmitter pairs (e.g., {461a+461d}–{461c} and {461e+461b}–{461c}) having the shorter spacing. The difference between current measurements may then be utilized to obtain the apparent formation resistivity. More particularly, the apparent formation resistivity $R_a$ is given by:

$$R_a = K \frac{1}{Re\{(I_2^{-1} - I_1^{-1})^{-1}\}}$$

where K is a scaling factor, and Re is a mathematic symbol indicating the real component of the expression in the parentheses.

FIGS. 13a–13d are plots showing the effect of different mud resistivities and mud standoffs on the measured current for different formation resistivities. The plots correspond to water-base muds with resistivities of 10, 100, 1,000 and 6,000 Ωm respectively. FIGS. 13a–13d indicate that as the mud becomes more resistive, the measured current fails to be indicative of the formation resitivity (i.e., the slope of the formation resistivity to the inverse of the measured current is zero).

FIGS. 14a–14d are plots showing the effect of mud resistivities and mud standoffs on the measured current for different formation resistivities after mud correction with two source sets (as in FIGS. 12a and 12b). In comparing FIGS. 14a–14d with FIGS. 13a–13d it will be appreciated that results are greatly improved. In the plots of FIGS. 14a–14d, the difference in current is shown to be clearly sensitive to the formation even when the mud is as resistive as 6,000 Ωm. However, it should be appreciated that the results shown in FIGS. 14a–14d are for ideal homogeneous formations. For thin layers, while the use of two sets of dipole-sources and the mud correction approach of FIGS. 12a and 12b may be useful, they may not be as effective as FIGS. 14a–14d would suggest.

Turning to FIGS. 15a–15d, plots of apparent formation resistivities versus frequency are shown for different formation resistivities for oil base muds with different standoffs. From FIGS. 15a–15d, it will be appreciated that using a pad-type or while-drilling type tool such as shown in FIGS. 12a and 12b, an operating frequency of as low as around 300 Khz can yield good results.

There have been described and illustrated herein several embodiments of tools for measuring formation characteristics and method associated therewith. While particular embodiments of the invention have been described, it is not intended that the invention be limited thereto, as it is intended that the invention be as broad in scope as the art will allow and that the specification be read likewise. Thus, while particular circuits for inducing current into the formation in a focused manner have been disclosed, it will be appreciated that other circuits can be provided as well. In addition, while particular types of tools such as pad-type and while-drilling type tools have been disclosed, it will be understood that the invention is useful for all types of formation investigation tools, including tools which are stationary during investigation, tools which are dragged through the borehole during investigation, and tools which rotate. Further, while embodiments of the invention where shown with either a single sensing button or an array of ten buttons, it will be appreciated that different numbers of sensing buttons can be utilized either on the pad-type or on the while-drilling type tools. It will therefore be appreciated by those skilled in the art that yet other modifications could be made to the provided invention without deviating from its spirit and scope as claimed.

What is claimed is:

1. A tool for investigating an earth formation traversed by a borehole, comprising:
   at least one oppositely polarized double-dipole means comprising a circuit which induces current from a surface element of said circuit facing the formation into an area of the formation in a focused manner; and
   at least one sensor electrode having a formation-facing surface which is insulated from said surface element of said circuit, at least partially surrounded by said circuit, and located in the area in which the current is focused.

2. A tool according to claim 1, wherein: said circuit has voltage applied thereto.

3. A tool according to claim 2, wherein:
   said double-dipole circuit includes a first dipole and a second dipole, said first dipole comprising a first electrode and a second electrode, said first electrode and second electrode being separated from each other by a first insulator element and said at least one sensor electrode being surrounded by said second electrode, said second electrode comprising said surface element, and said second dipole comprising a third electrode and said second electrode, said third electrode and said second electrode being separated from each other by a second insulator element, and said area in which current is focused being located between said first insulator element and said second insulator element.

4. A tool according to claim 3, wherein:
   said first insulator element and said second insulator element are coupled together.

5. A tool according to claim 4, wherein:
   said first electrode and said second electrode are separated by no more than 10 cm.

6. A tool according to claim 5, wherein:
   said first electrode and said second electrode are separated by no more than 1 cm.

7. A tool according to claim 6, wherein:
   said third electrode and said second electrode are separated by no more than 1 cm.

8. A tool according to claim 5, wherein:
   said third electrode and said second electrode are separated by no more than 10 cm.

9. A tool according to claim 3, wherein:
   said sensor electrode and said second electrode are maintained at same voltages.

10. A tool according to claim 2, wherein:
    said at least one sensor electrode comprises an array of sensor electrodes.

11. A tool according to claim 10, wherein:
    said array of sensor electrodes comprises a two-dimensional array of sensor electrodes.

12. A tool according to claim 10, wherein:
    said at least one oppositely polarized double-dipole current inducing circuit comprises two oppositely polarized double-dipole circuits.

13. A tool according to claim 12, wherein:
    said two oppositely polarized double-dipole circuits are comprised of first, second, third, fourth and fifth electrode elements, and first, second, third, and fourth insulator elements,
    a first of said two double-dipole circuits includes a first dipole and a second dipole, said first dipole comprising said first and said fourth electrodes and said second electrode, said first electrode and second electrode being separated from each other by said first insulator element and said at least one sensor electrode being surrounded by said second electrode, and said second dipole comprising said third and fifth electrodes and said second electrode, said third electrode and said second electrode being separated from each other by said second insulator element, and
    a second of said two double-dipole circuits includes a third dipole and a fourth dipole, said third dipole comprising said fourth electrode and said first, said second and said third electrodes, said fourth electrode and said first electrode being separated from each other by said third insulator, and said fourth dipole comprising said fifth electrode and said first, said second, and said third electrodes, said fifth electrode and said third electrode being separated from each other by said fourth insulator element.

14. A tool according to claim 13, wherein:
    said first insulator element, said second insulator element, said third insulator element, and said fourth insulator element are coupled together.

15. A tool according to claim 13, wherein:
    said first electrode and said second electrode are separated by no more than 10cm, and said third electrode and said second electrode are separated by no more than 10 cm.

16. A tool according to claim 15, wherein:
    said first electrode and said second electrode are separated by no more than 1 cm, and said third electrode and said second electrode are separated by no more than 1 cm.

17. A tool according to claim 12, wherein:
    said at least one sensor electrode comprises an array of sensor electrodes.

18. A tool according to claim 17, wherein:
    said array of sensor electrodes comprises a two-dimensional array of sensor electrodes.

19. A tool according to claim 12, wherein:
in a first mode of operation, said current source provides a first operating frequency to a first of said two dipole circuits and a second operating frequency different from said first operating frequency to a second of said two dipole circuits.

20. A tool according to claim 19, wherein:
said first operating frequency and said second operating frequency are both at least 300 Khz.

21. A tool according to claim 12, wherein:
in a first mode of operation, said current source fires said first of said two dipole circuits and said second of said two dipole circuits alternatively.

22. A tool according to claim 1, wherein:
said circuit includes a current source having an operating frequency of between 5 Mhz and 100 Mhz in a first mode of operation.

23. A tool according to claim 22, wherein:
said current source has an operating frequency of on the order of 500 Khz in a second mode of operation.

24. A tool according to claim 1, wherein:
said circuit which induces current comprises at least one coil arranged in a toroidal configuration.

25. A tool according to claim 24, wherein:
said circuit which induces current further comprises insulation in which said coil is located, said insulation at least partially surrounding the area in which the current is focused.

26. A tool according to claim 25, wherein:
said circuit which induces current further comprises a first return electrode, a second return electrode and a central electrode between said first return electrode and said second return electrode, said insulation separating said central electrode from said first return electrodes and from said second return electrode.

27. A tool according to claim 26, wherein:
said first return electrode and said second return electrode are located no more than 10 cm away from said central electrode.

28. A tool according to claim 25, wherein:
said at least one sensor electrode comprises an array of sensor electrodes.

29. A tool according to claim 28, wherein:
said array of sensor electrodes comprises a two-dimensional array of sensor electrodes.

30. A tool according to claim 24, wherein:
said circuit which induces current comprises a first coil arranged in a toroidal configuration and located in a first insulated area, a second coil arranged in an a toroidal configuration, spaced from said first coil, and located in a second insulated area, a central electrode between said first insulated area and said second insulated area and surrounding said at least one sensor electrode, a first return electrode adjacent said first coil, and a second return electrode adjacent said second coil.

31. A tool according to claim 30, wherein:
said circuit which induces current comprises a third coil arranged in a toroidal configuration and located in a third insulated area adjacent said first return electrode, a third return electrode adjacent said third insulated area, a fourth coil arranged in a toroidal configuration and located in a fourth insulated area adjacent said second return electrode, and a fourth return electrode adjacent said fourth insulated area.

32. A tool according to claim 1, further comprising:
a tool body and a plurality of pads coupled to said tool body, said plurality of pads each including a respective said circuit and a respective at least one sensor electrode.

33. A tool according to claim 1, wherein:
said tool is a while-drilling tool adapted to rotate with a drill string.

34. A method for investigating an earth formation traversed by a borehole, comprising:
using at least one oppositely polarized double-dipole means having a circuit including a first electrode, a second electrode, and a third electrode, said second electrode being separated from said first electrode by a first insulator and being separated by said third electrode by a second insulator, inducing current into an area of the formation adjacent said second electrode in a focused manner; and
using at least one sensor electrode having a formation-facing surface which is insulated a surface element of the circuit and surrounded by said second electrode, measuring a first electrical signal at said at least one sensor electrode resulting from induced current.

35. A method according to claim 34, wherein:
said inducing comprises, in a first mode, inducing a current signal of at least 5 Mhz.

36. A method according to claim 35, wherein:
said inducing comprises, in a second mode, inducing a current signal of on the order of 500 Khz.

37. A method according to claim 34, further comprising:
using said first electrical signal, determining an indication of one of formation resistivity, apparent formation resistivity, and formation permittivity adjacent said sensor electrode.

38. A method according to claim 37, wherein:
said first electrical signal is a current signal I, and said determinating an indication comprises determining an apparent formation resistivity $R_a$ according to $R_a = K \, \text{Re}\{I^{-1}\}$ where K is a scaling factor and Re is a mathematic symbol indicating the real part of the expression in parenthesis.

39. A method according to claim 34, wherein:
said electrical circuit comprises a fourth electrode and a fifth electrode, said fourth electrode being separated from said first electrode by a third insulator, said fifth electrode being separated from said third electrode by a fourth insulator,
said first, second, third, fourth and fifth electrodes are adapted to comprise first and second sets of double-dipole circuits which induce currents in said formation,
said sensor electrode senses said first electrical signal and a second electrical signal respectively generated by said first and second sets of double-dipole circuits.

40. A method according to claim 39, further comprising:
using said first electrical signal and said second electrical signal, determining an indication of one of formation resistivity, apparent formation resistivity, and formation permittivity adjacent said sensor electrode.

41. A method according to claim 40, wherein:
said first electrical signal is a current signal b, said second electrical signal is a current signal $I_2$, and said deter minating an indication comprises determining an apparent formation resistivity $R_a$ according to $$R_a = K \frac{1}{\text{Re}\{(I_2^{-1} - I_1^{-1})^{-1}\}}$$

where K is a scaling factor and Re is a mathematic symbol indicating the real part of the expression in parenthesis.

42. A method according to claim 41, wherein:

said first electrical signal is generated at a different time than said second electrical signal.

43. A method according to claim 41, wherein:

said first and second sets of double-dipole circuits are adapted to operate at different frequencies.

* * * * *